US009967752B2

United States Patent
Luo et al.

(10) Patent No.: US 9,967,752 B2
(45) Date of Patent: May 8, 2018

(54) TRANSMISSION AND RECEPTION OF COMMON CHANNEL IN AN UNLICENSED OR SHARED SPECTRUM

(71) Applicant: QUALCOMM Incorporated, San Diego, CA (US)

(72) Inventors: Tao Luo, San Diego, CA (US); Wanshi Chen, San Diego, CA (US); Naga Bhushan, San Diego, CA (US); Durga Prasad Malladi, San Diego, CA (US); Yongbin Wei, San Diego, CA (US); Srinivas Yerramalli, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/454,400

(22) Filed: Aug. 7, 2014

(65) Prior Publication Data

US 2015/0043523 A1    Feb. 12, 2015

Related U.S. Application Data

(60) Provisional application No. 61/864,747, filed on Aug. 12, 2013.

(51) Int. Cl.
*H04W 72/04* (2009.01)
*H04W 16/14* (2009.01)
(Continued)

(52) U.S. Cl.
CPC ............ *H04W 16/14* (2013.01); *H04B 1/713* (2013.01); *H04L 5/001* (2013.01); *H04L 5/0012* (2013.01);
(Continued)

(58) Field of Classification Search
CPC ...... H04W 16/14; H04W 72/04; H04W 36/02
See application file for complete search history.

(56) References Cited

U.S. PATENT DOCUMENTS

| 5,509,027 A | 4/1996 | Vook et al. | |
| 7,349,381 B1 * | 3/2008 | Clark | H04B 1/7156 370/350 |

(Continued)

FOREIGN PATENT DOCUMENTS

| GB | WO 2012/171867 | * 12/2012 | ............ H04W 72/08 |
| JP | WO 2012/164531 | * 12/2012 | ........... H04B 1/7143 |

(Continued)

OTHER PUBLICATIONS

ISA/EPO, International Search Report and Written Opinion of the International Searching Authority, Int'l App. No. PCT/US2014/050366, Oct. 22, 2014, European Patent Office, Rijswijk, NL, 13 pgs.

*Primary Examiner* — Lakeram Jangbahadur
(74) *Attorney, Agent, or Firm* — Holland & Hart LLP

(57) ABSTRACT

Methods, systems, and apparatuses are described for wireless communications, in which transmission of common information to two or more receivers over unlicensed spectrum may be provided. The common information may be transmitted over a number (e.g., a set) of different carrier frequencies of the unlicensed spectrum. A staggering pattern may be employed to transmit all or a part of the common information across each of the carrier frequencies in the set of carrier frequencies. The detection of the information on one of the carrier frequencies may provide information that may be used to derive the staggering pattern. The duration of the common information transmission on each of the carrier frequencies may be selected such that a clear channel
(Continued)

assessment (CCA) to determine availability of the unlicensed spectrum is not required.

22 Claims, 14 Drawing Sheets

(51) Int. Cl.
  *H04L 5/00* (2006.01)
  *H04L 27/00* (2006.01)
  *H04B 1/713* (2011.01)
  *H04W 36/22* (2009.01)
(52) U.S. Cl.
  CPC ........ *H04L 27/0006* (2013.01); *H04L 5/0041* (2013.01); *H04W 36/22* (2013.01)

(56) References Cited

U.S. PATENT DOCUMENTS

2012/0264468 A1* 10/2012 Turtinen .................. H04L 5/001
  455/509
2013/0107116 A1* 5/2013 Charbit ................... H04L 5/003
  348/388.1

FOREIGN PATENT DOCUMENTS

| JP | WO 2012/164536 | * 12/2012 | ............ H04W 16/14 |
| WO | WO-2012164531 A1 | 12/2012 | |
| WO | WO-2012164536 A1 | 12/2012 | |
| WO | WO-2012171867 A1 | 12/2012 | |

* cited by examiner

TRANSMISSION AND RECEPTION OF COMMON CHANNEL IN AN UNLICENSED OR SHARED SPECTRUM

CROSS REFERENCES

The present application for patent claims priority to U.S. Provisional Patent Application No. 61/864,747 by Luo et al, entitled "Transmission and Reception of Common Channel in LTE-U," filed Aug. 12, 2013, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of WLANs to offload some of the traffic and/or signaling of a cellular network. WLANs (or WiFi networks) are attractive because, unlike cellular networks that operate in a licensed spectrum, WiFi networks generally operate in an unlicensed spectrum. However, access to unlicensed spectrum may need to be coordinated to ensure that access points of the same or different operator deployments, using the same or different techniques for accessing the unlicensed spectrum, may co-exist and make effective use of the unlicensed spectrum.

SUMMARY

The described features generally relate to one or more improved systems, methods, and/or devices for wireless communications, and more particularly, to transmission of common information to be received at a plurality of receivers over unlicensed spectrum. The common information may be transmitted over a number of different carrier frequencies of the unlicensed spectrum. A set of the carrier frequencies of the unlicensed spectrum may be identified for use in the transmission of the common information, and a staggering pattern may be employed to transmit all or a part of the common information across each of the carrier frequencies in the set of carrier frequencies. The staggering pattern may allow information to be transmitted at different times on different carrier frequencies. The detection of the information on one of the carrier frequencies may provide information that may be used to derive the staggering pattern. The duration of the common information transmission on each of the carrier frequencies may be selected such that a clear channel assessment (CCA) to determine availability of the unlicensed spectrum is not required.

A method for wireless communications includes identifying a set of carrier frequencies of an unlicensed spectrum for transmission of common information to be received at a plurality of receivers, and determining a staggering pattern for transmitting the common information across each of the carrier frequencies in the set of carrier frequencies. The method may also include transmitting the common information over the set of carrier frequencies according to the staggering pattern. The common information may include one or more of synchronization information, broadcast channel information, or paging information.

In some examples, the staggering pattern may include synchronization information transmission on each of the carrier frequencies, and transmission of broadcast or paging information on a subset of the carrier frequencies. A transmission bandwidth of the synchronization information may be, in some examples, less than an available transmission bandwidth for a respective carrier frequency, and additional information may be transmitted using remaining available transmission bandwidth. The paging information may include, for example, information identified for a specific UE transmitted during a paging opportunity for the UE, and the paging opportunity may be a function of one or more UE identifications, one or more carrier frequencies, or both. The paging information may be staggered across two or more of the set of carrier frequencies.

In some examples, a time period for transmission of the common information on each carrier frequency may be less than a predetermined time period. For example, the predetermined time period may be less than a period of time that requires performance of clear channel assessment (CCA) to determine availability of the unlicensed spectrum. The staggering pattern may be a predetermined staggering pattern that is determinable upon detection of the common information transmission on one of the set of carrier frequencies. Determining the staggering pattern may include selecting non-overlapping time periods for transmission of the common information on each carrier frequency of the set of carrier frequencies. The time periods for transmission on different frequencies of the set of carrier frequencies may be selected to provide at least a portion of the common information at a plurality of times during a time period of the staggering pattern. In some examples, each frequency of the set of carrier frequencies may include at least one transmission of common information during the time period of the staggering pattern. The method may also include transmitting the staggering pattern to one or more receivers. Additionally or alternatively, the method may include blanking out a subset of carrier frequencies from the set of carrier frequencies while at least a portion of the common information is being transmitted on at least one of the set of carrier frequencies. The staggering pattern may be a semi-static staggering pattern, and included in synchronization information transmitted on one or more of the carrier frequencies. In some examples, the set of carrier frequencies may include at least one anchor frequency and a number of flexible carrier frequencies selected from a group of available carrier frequencies.

Another method for wireless communications includes receiving a common information transmission on a carrier frequency of an unlicensed spectrum, and determining a staggering pattern for transmissions of common information across a set of carrier frequencies based on the received common information transmission. In some examples, the determining may include identifying a frequency of the carrier frequency and a time of reception of the common information transmission, and determining the staggering pattern based on the frequency and time of reception. The receiving a common information transmission, in some examples, may include searching multiple carrier frequencies for the common information transmission. Such searching may include searching the multiple carrier frequencies in parallel, or searching a portion of the bandwidth for each carrier frequency in parallel. The searching may also include combining signals from different carrier frequencies over time to detect a synchronization signal.

In some examples, the method may also include reporting the staggering pattern to a base station for inter-frequency measurement purposes. The common information transmission may include signaling indicating the staggering pattern. In still other examples, the method may also include performing an inter-frequency measurement using information from the staggering pattern. The common information may include one or more of synchronization information, broadcast channel information, or paging information. The staggering pattern may include synchronization information transmission on each of the carrier frequencies, and transmission of broadcast or paging information on a subset of the carrier frequencies. The paging information may include information identified for a specific UE transmitted during a paging opportunity for the UE, and the paging opportunity may be a function of one or more UE identifications, one or more carrier frequencies, or both. The staggering pattern may be a predetermined staggering pattern that is determinable upon detection of the common information transmission on one of the set of carrier frequencies, and/or a semi-static staggering pattern included in synchronization information transmitted on one or more of the carrier frequencies. In some examples, the set of carrier frequencies may include at least one anchor frequency and a plurality of flexible carrier frequencies selected from a group of available carrier frequencies.

Another aspect of the disclosure provides an apparatus for wireless communications. The apparatus may generally include a processor and a memory coupled to the processor. The processor may be configured to identify a set of carrier frequencies of an unlicensed spectrum for transmission of common information to be received at a plurality of receivers, and determine a staggering pattern for transmitting the common information across each of the carrier frequencies in the set of carrier frequencies. In certain examples, the instructions may further cause the apparatus to perform one or more aspects of the functionality described above with reference to the method for wireless communications.

In another aspect, an apparatus for wireless communications may include a processor and a memory coupled to the processor. The processor may be configured to receive a common information transmission on a carrier frequency of an unlicensed spectrum, and determine a staggering pattern for transmissions of common information across a set of carrier frequencies based on the received common information transmission. In certain examples, the instructions may further cause the apparatus to perform one or more aspects of the functionality described above with reference to the method for wireless communications.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
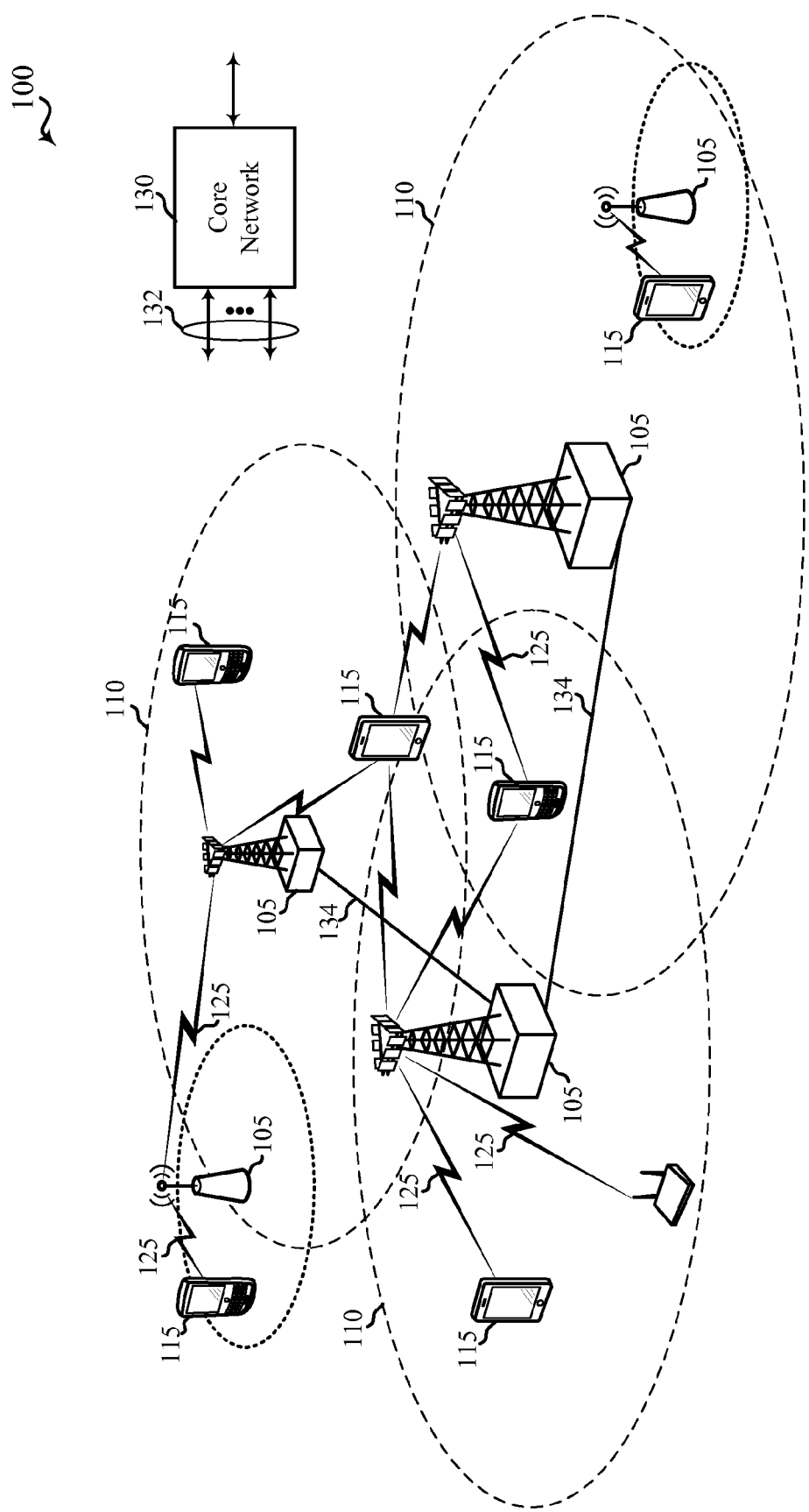
FIG. 1 shows a diagram of a wireless communications system.

The present disclosure is directed to methods, apparatuses, systems, and devices in which an unlicensed spectrum (e.g., a spectrum typically used for WiFi communications) may be used for cellular communications (e.g., Long Term Evolution (LTE) communications). In particular, the disclosed example methods, apparatuses, systems and devices are directed to improving access speed to a channel in the unlicensed spectrum and/or overcoming power constrains that may arise when operating in the unlicensed frequency band.

As the offloading of traffic from cellular networks to the unlicensed spectrum continues to increase, access to unlicensed spectrum may need to be coordinated to ensure that access points of the same or different operator deployments, using the same or different techniques for accessing the unlicensed spectrum, may co-exist within the unlicensed spectrum. In some cases, common information may be transmitted to a number of different receivers, or user equipment (UE), over unlicensed spectrum. Such common information may include, for example, synchronization information associated with an eNB, broadcast channel information from an eNB, or paging information that may be received by a UE. The common information may be transmitted over a number of different carrier frequencies of the unlicensed spectrum. A set of the carrier frequencies of the unlicensed spectrum may be identified for use in the transmission of the common information, and a staggering pattern may be employed to transmit all or a part of the common information across each of the carrier frequencies in the set of carrier frequencies. The staggering pattern may allow information to be transmitted at different times on different carrier frequencies. The detection of the information on one of the carrier frequencies may provide information that may be used to derive the staggering pattern. The duration of the common information transmission on each of the carrier frequencies may be selected such that CCA to determine availability of the unlicensed spectrum is not required.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various examples. Some of the access points 105 may communicate control information and/or user data with the core network 130 through backhaul links 132. In some examples, some of the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some examples, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some examples, the wireless communications system 100 may include an LTE/LTE-A communications system (or network) that supports one or more modes of operation or deployment scenarios in the unlicensed frequency spectrum. In other examples, the wireless communications system 100 may support wireless communications using an unlicensed spectrum and an access technology different from LTE conducted over an unlicensed spectrum, or a licensed spectrum and an access technology different from LTE/LTE-A. In LTE/LTE-A communications systems, the term evolved NodeB or eNB may be generally used to describe of the access points 105. The wireless communications system 100 may be a heterogeneous network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul links 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some examples of the wireless communications system 100, various deployment scenarios for LTE communications over the unlicensed spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Transmissions using the unlicensed spectrum may be carried using one or more carrier frequencies in the unlicensed frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, a device seeking to transmit using unlicensed spectrum may be required to verify that the spectrum is available for use in such a transmission, that is, the spectrum is not already in use by one or more other devices. One such operation is known as clear channel assessment or CCA, and may be used to determine availability of the unlicensed spectrum. Performance of a CCA generally involves checking that the desired spectrum is not otherwise occupied prior to initiating transmissions. Such techniques are known in the art and therefore not described in further detail here for brevity. In some deployments, however, a transmitter may transmit a short burst without performing CCA. In such deployments, a transmitter may be allowed to transmit up to a certain percentage of a transmission duty cycle without performing CCA. For example, a transmitter may be allowed to transmit a burst that is no longer than 2 milliseconds (ms) over a 50 ms duty cycle without performing CCA. According to some examples described herein, a transmitter may use such bursts to transmit common information to a number of receivers. For example, an eNB may use short bursts to transmit synchronization information to a number of UEs. Transmission of synchronization information using such short bursts may provide the UEs with faster access to a channel which in turn may enhance power and memory usage of the UE. The use of short burst for transmission of common information may also provide enhanced spectrum utilization. Base stations or eNBs 105 as well as UEs 115 may support one or more of these or similar modes of operation. Additional details regarding the implementation of LTE over the unlicensed spectrum deployment scenarios or modes of operation in a system such as the wireless communications system 100, as well as other features and functions related to the operation of LTE over the unlicensed spectrum, are provided below with reference to FIGS. 2-13.

Figure 2:
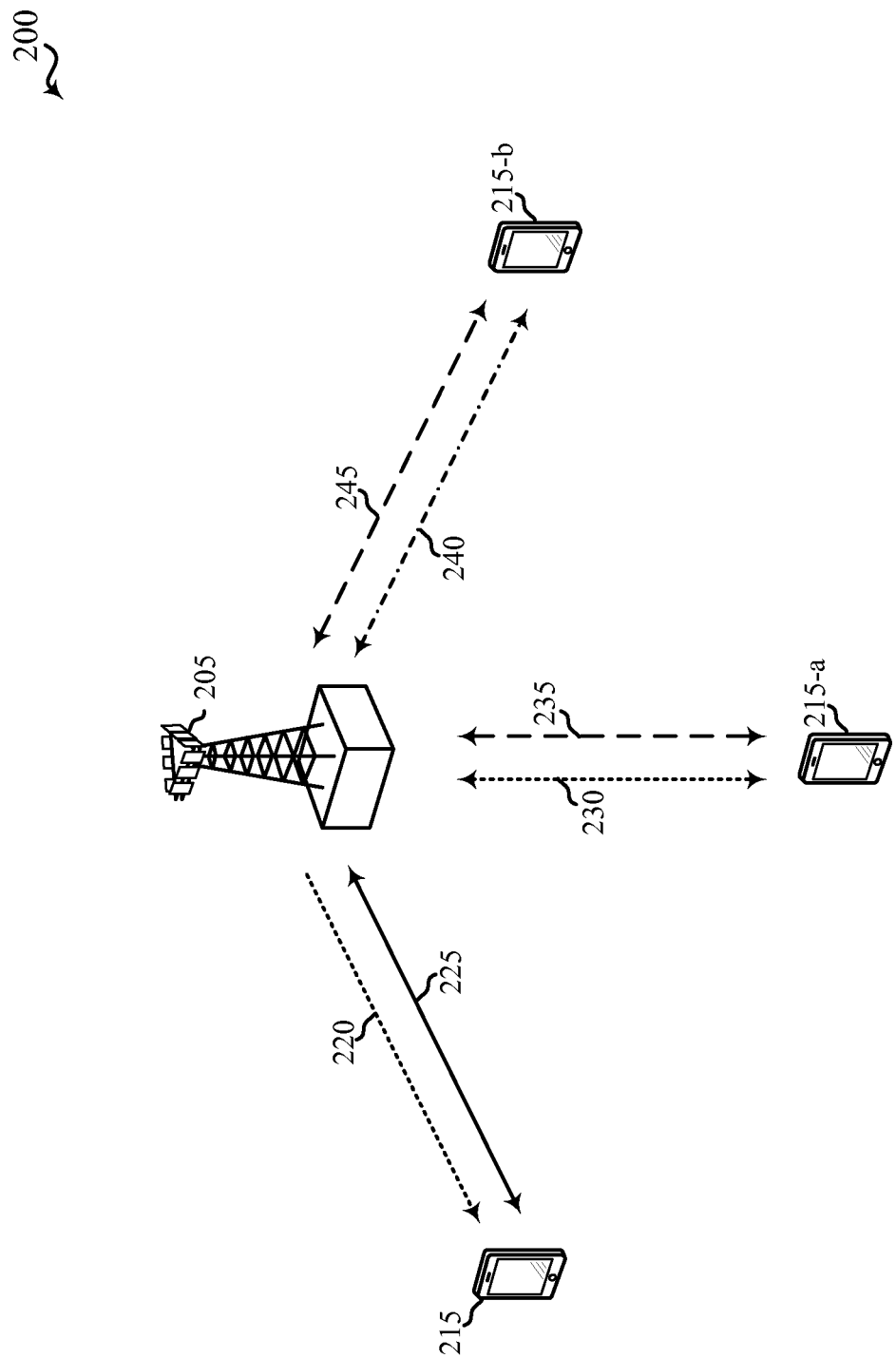
FIG. 2 shows a diagram of a wireless communications system that illustrates examples of deployment scenarios for using LTE in an unlicensed spectrum according to various examples.

Turning next to FIG. 2, a wireless communications system 200 illustrates examples of a supplemental downlink mode and of a carrier aggregation mode for an LTE network that supports LTE over the unlicensed spectrum. The wireless communications system 200 may be an example of portions of the wireless communications system 100 described with reference to FIG. 1. Moreover, the eNB 205 may be an example of one of the access points 105 of FIG. 1, while the UEs 215 may be examples of the UEs 115 described with reference to FIG. 1.

In the example of a supplemental downlink mode in the wireless communications system 200, the eNB 205 may transmit OFDMA communications signals to a UE 215 using a downlink 220. The downlink 220 may be associated with a frequency in an unlicensed spectrum. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed spectrum. The downlink 220 in the unlicensed spectrum and the bidirectional link 225 in the licensed spectrum may operate concurrently. The downlink 220 may provide a downlink capacity offload for the eNB 205. In some examples, the downlink 220 may be used for unicast services (e.g., addressed to one UE) or for multicast services (e.g., addressed to several UEs). This scenario may occur with any service provider (e.g., a traditional mobile network operator or MNO) that uses a licensed spectrum and needs to relieve some of the traffic and/or signaling congestion.

In one example of a carrier aggregation mode in the wireless communications system 200, the eNB 205 may transmit OFDMA communications signals to a UE 215-a using a bidirectional link 230 and may receive SC-FDMA communications signals from the same UE 215-a using the bidirectional link 230. The bidirectional link 230 may be associated with the frequency in the unlicensed spectrum. The eNB 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency in a licensed spectrum. The bidirectional link 230 may provide a downlink and uplink capacity offload for the eNB 205. Like the supplemental downlink described above, this scenario may occur with any service provider (e.g., an MNO) that uses a licensed spectrum and needs to relieve some of the traffic and/or signaling congestion.

In another example of a carrier aggregation mode in the wireless communications system 200, the eNB 205 may transmit OFDMA communications signals to a UE 215-b using a bidirectional link 240 and may receive SC-FDMA communications signals from the same UE 215-b using the bidirectional link 240. The bidirectional link 240 may be associated with the frequency in an unlicensed spectrum. The eNB 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency of link 235 in the licensed spectrum. The bidirectional link 240 may provide a downlink and uplink capacity offload for the eNB 205. This example and those provided above are presented for illustrative purposes and there may be other similar modes of operation or deployment scenarios that combine LTE communications over licensed and unlicensed spectrums for capacity offload.

As described above, the typical service provider that may benefit from the capacity offload offered by using LTE in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE over the unlicensed spectrum may be transported over the LTE uplink in the licensed spectrum (e.g., uplink portion of the bidirectional link 225). One of the reasons to provide downlink capacity offload is because data demand is largely driven by downlink consumption. Moreover, in this mode, there may not be a regulatory impact since the UE 215 is not transmitting in the unlicensed spectrum.

In the carrier aggregation mode, data and control may be communicated in LTE over the licensed spectrum (e.g., bidirectional links 235 and 245) while data may be communicated in LTE over the unlicensed spectrum (e.g., bidirectional links 230 and 240). The carrier aggregation mechanisms supported when using LTE over the unlicensed spectrum may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed spectrum. As mentioned above, whenever a UE 215 desires to gain channel access to one or more communications channels with eNB 205, the UE 215 may, for example, request establishment or reestablishment of a connection with the eNB 205. Prior to transmitting such a request, however, the UE 215 may need to determine one or more various characteristics of the channel, which may determine when and how the UE 215 transmits such a request. In some examples, eNB 205 may transmit bursts of information that may be used by a UE, such as UE 215, to gain channel access. As mentioned above, such bursts may be transmitted without requiring CCA to be performed before such a transmission. In some examples, UE 215 may have knowledge of when to expect such a burst, and may receive and decode the burst to determine synchronization information of the eNB 205, for example. In other examples, such a burst may include other information, such as broadcast information or paging information, for example. Transmission of such information may make it easier for the UE 215 to detect synchronization and decode a broadcast channel, for example.

Figure 3:
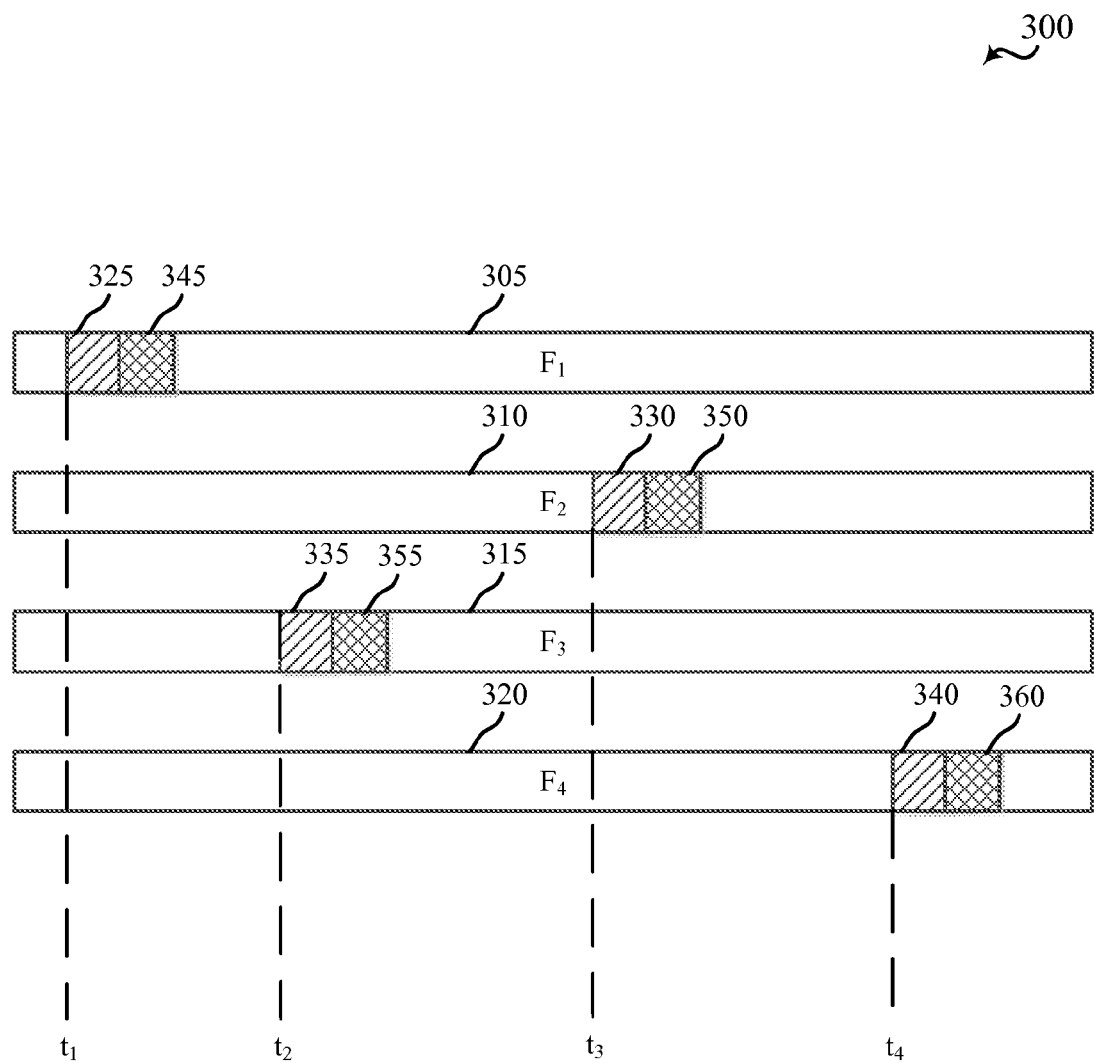
FIG. 3 illustrates an example of carrier frequencies in an unlicensed spectrum and transmission of common information on the carrier frequencies according to a staggering pattern according to various examples.

FIG. 3 illustrates an example staggering pattern 300 of common information transmitted using an unlicensed spectrum according to various examples. In particular, the staggering pattern 300 shows how common information transmission may be staggered in time over different frequencies of the unlicensed spectrum. In the example of FIG. 3, the unlicensed spectrum includes a number of carrier frequencies, with a set of the carrier frequencies 305-320 that may include transmissions of common information. In some examples, a set of carrier frequencies may be grouped as a cluster with transmission of the common information (e.g. synchronization information and broadcast channel information) being coordinated among clusters. In some examples, the unlicensed carrier frequencies 305-320 may be an example of carrier frequencies used by one or more of the eNBs 105, 205, and/or UEs 115, 215 described with reference to FIGS. 1 and/or 2. As discussed above, common information may be transmitted using short transmission bursts from an eNB to one or more UEs. Such common information, may be transmitted using the set of carrier frequencies 305-320 of unlicensed spectrum.

In some examples, each carrier frequency 305-320 in the set of carrier frequencies may include common information. For example, a first ($F_1$) carrier frequency 305 may include synchronization information 325, a second ($F_2$) carrier frequency 310 may include synchronization information 330, a third ($F_3$) carrier frequency 315 may include synchronization information 335, and a fourth ($F_4$) carrier frequency 320 may include synchronization information 340. Similarly, each carrier frequency 305-320 may also include broadcast channel information 345-360. According to some examples, the combined duration of the synchronization information 325-340 and broadcast information 345-360 transmissions on each carrier frequency 305-320 may be less than a predetermined time period. In some examples, the combined duration may be less than a period of time that would otherwise require CCA to determine availability of the unlicensed spectrum. Thus, in such cases, the common information transmissions, including the synchronization information 325-340 and broadcast information 345-360 transmissions, may be transmitted without performing CCA.

In the example of FIG. 3, each carrier frequency 305-320 includes both synchronization information 325-340 and broadcast channel information 345-360 in a contiguous block. However, in other examples, some of which will be described below, each carrier frequency 305-320 may include a subset of one or more of synchronization information 325-340 and/or broadcast information 345-360. Additionally, such synchronization information 325-340 and broadcast information 345-360, if both are transmitted on one of the carrier frequencies 305-320, may be transmitted contiguously or dis-contiguously. According to various examples, a staggering pattern for transmitting such common information 325-360 across each of the carrier frequencies 305-320 in the set of carrier frequencies may be provided. In the example of FIG. 3, synchronization information 325 and broadcast information 345 are transmitted on carrier frequency $F_1$ 305 at time $t_1$. At some time after $t_1$, synchronization information 335 and broadcast information 355 are transmitted on carrier frequency $F_3$ 315 at time $t_2$. At time $t_3$, in this example, synchronization information 330 and broadcast information 350 are transmitted on carrier frequency $F_2$ 310. Finally, at time $t_4$, synchronization information 340 and broadcast information 360 are transmitted on carrier frequency $F_4$ 320.

As mentioned above, in some deployments a CCA procedure may not be required when transmissions are less than a predetermined length. In particular, the CCA procedure may not be used, for example, when transmissions are short bursts that occupy a small percentage of a duty cycle. According to various examples, the duration of the transmission containing the synchronization information 305-320 and broadcast information 345-360 is selected to be less than a transmission duration that would require a CCA procedure to be performed. In some examples, an eNB may transmit the common information during a predetermined time period according to a set schedule (i.e. using a pre-defined staggering pattern) that may be transmitted to one or more UEs, or that the UEs may derive based on the detection of one or more of the transmissions containing the common information. In other words, the schedule according to which the common information is transmitted may be pre-defined and signaled to the UEs by eNB. Alternatively, the staggering pattern may be encoded such that the UEs can determine the overall transmission pattern of the common information by detecting a subset of the transmissions containing the common information.

Continuing with the example of FIG. 3, the set of carrier frequencies 305-320 may be provided to UEs, along with a time schedule of $t_1$ through $t_4$ according to which the common information is transmitted. In some examples, a cluster of a predefined set of carrier frequencies may be signaled to the UEs along with the schedule. The UEs may search for the common information transmission on a selected carrier frequency at a particular time to obtain the common information. For example, the UEs may search carrier frequency 305 at time $t_1$ to obtain synchronization information 325 and broadcast information 345. In other examples, a UE may be provided with information related to relative times of transmissions on different carrier frequencies, and upon detection of one of the common information transmissions (e.g. synchronization information 325-340), the UE may derive the other carrier frequencies and times of transmission of other common information. In yet other examples, the UE may derive carrier frequency and time of transmission of other common information from a common information transmission on one of the carrier frequencies, one at a time. According to this example, each detected common information transmission may provide the UE with information related to the carrier frequency and time of other common information transmission, such that each newly detected common information transmission provides the UE with an information about the carrier frequency and time of another common information transmission.

In some examples, a receiver (e.g., a UE) may search for common information transmissions 325-360 by searching one of the carrier frequencies for the entire duration of the staggering pattern, or may search each of the set of carrier frequencies 305-320 in parallel. In examples where a UE receives information on the staggering pattern, such information may be provided to the UE semi-statically in a system information block (SIB) or radio resource control (RRC) configuration/reconfiguration message from an eNB, for example. The staggering pattern may also be included in synchronization information 325-340 or broadcast information 345-360 transmitted on one or more of the carrier frequencies 305-320. In some examples, the set of carrier frequencies 305-320 may include an anchor or fixed frequency (e.g., carrier frequency 305), with the remainder of the carrier frequencies (e.g., carrier frequencies 310-320) being flexible carrier frequencies selected from a group of available carrier frequencies. In such examples, a UE or other receiver may monitor anchor frequency 305 for the common information transmissions 325, 345, and determine other frequencies 310-320 and/or staggering pattern transmission times (e.g., $t_2$-$t_4$) based on information contained in the common information transmission of the anchor frequency. Similarly as described above, such staggering pattern information may be explicitly transmitted, or may be derived from relative frequencies and/or transmission times that may be provided in the received common information.

In the example of FIG. 3, transmission times $t_1$ through $t_4$, and the associated carrier frequencies 305-320 may be selected to provide at least a portion of the common information in transmissions 325-360 at a number of different times during a time period of the staggering pattern. By transmitting common information 325-360 according to such a staggering pattern across multiple carrier frequencies 305-320, a more frequent transmission of common information may be achieved although the common information may occupy different carrier frequencies over time. A receiver, such as a UE, searching for common information may be able to have a reduced search time, as the time from initiating such a search until the time of transmission on one of the carrier frequencies 305-320 may be relatively short. Such staggering also allows the total time of the transmission bursts containing the common information transmissions 325-360 to remain less than the time at which a CCA would be required, and reduces interference that may be generated on any particular carrier frequency 305-320. Additionally, transmission of common information according to a staggering pattern may also help control and/or reduce power when operating in an unlicensed frequency band in which power may be constrained. According to some examples, power usage may be controlled and/or reduced by transmitting common information on one carrier frequency (or selected number of carriers) while blanking out the remaining carriers or a subset of carriers. Blanking out a subset of carriers during transmission on one of the other carriers may help to achieve larger coverage as more power is concentrated in the transmitting carrier.

In some cases, multiple eNBs may transmit common information according to the same staggering pattern. In some cases, different eNBs may be operated by different network operators, or may be operated by the same network operator. According to some examples, a receiver that receives the common information 325-360 according to the staggering pattern on carrier frequencies 305-320 transmitted by a first eNB may report the staggering pattern to another eNB for inter-frequency measurement purposes, and inter-frequency measurement may be performed using the information from the staggering pattern. An eNB may provide such information to other receivers to assist the other receivers in searching for the common information transmissions and/or performing inter-frequency measurements.

While common information is described above as including synchronization and/or broadcast information, such common information may also include other information. For example, in some examples common information may include paging information identified for a specific UE transmitted during a paging opportunity for the UE, and paging opportunities for a UE may be a function of UE ID and/or carrier index, thus providing paging opportunities on multiple carrier frequencies. A UE may monitor portions of common information transmissions 325-360 based on the paging opportunities for the UE to determine if paging information is being provided to the UE. Thus, paging information may be included in multiple different carrier frequencies, which may thus provide additional opportunities for paging of a UE and may reduce delay in providing a paging message to a UE. Paging information, as is known in the art, may be used to inform UEs about a system information change and/or provide alerts to a UE such as ETWS (Earthquake and Tsunami Warning System) or CMAS (Commercial Mobile Alert System) alerts, for example.

Figure 4:
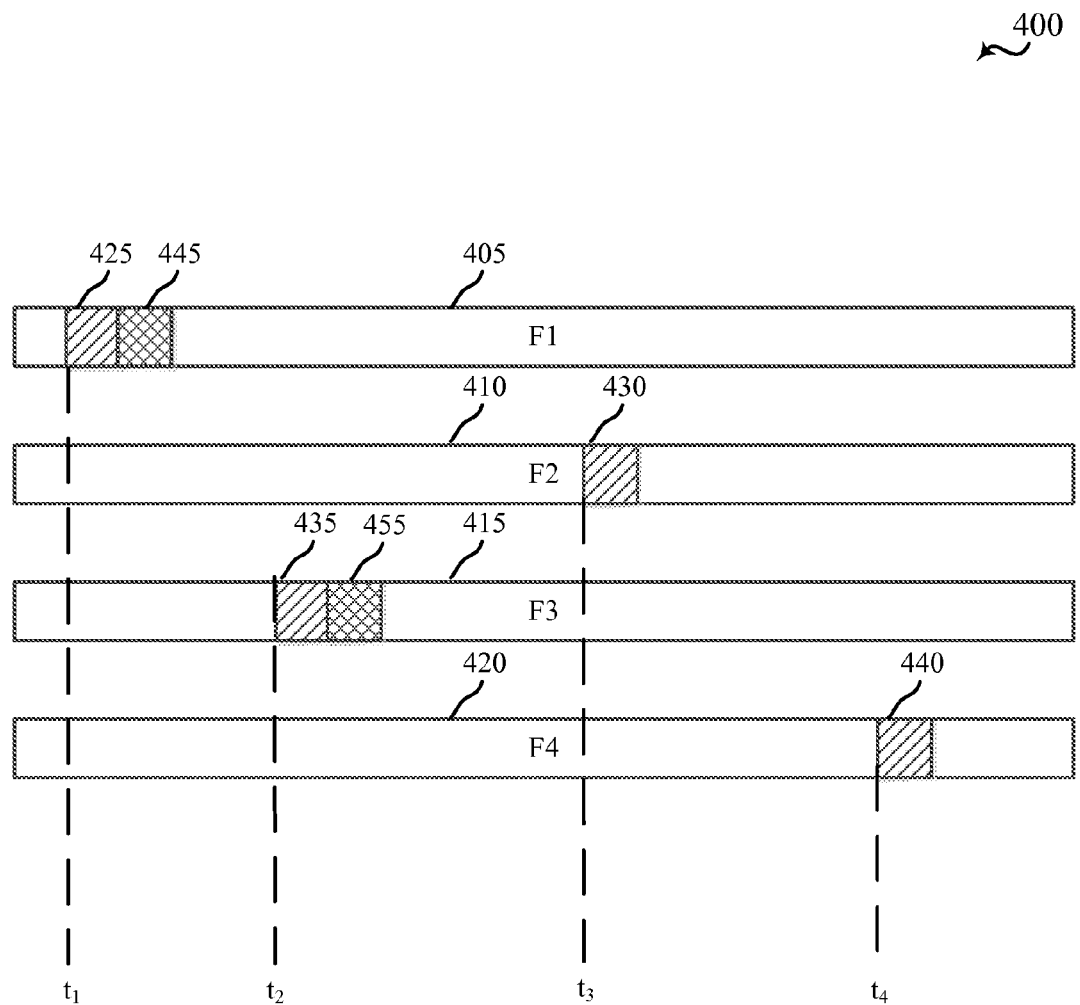
FIG. 4 illustrates another example of carrier frequencies in an unlicensed spectrum and transmission of common information on the carrier frequencies according to a staggering pattern according to various examples.

In further examples, the common information transmitted on different carrier frequencies of a set of carrier frequencies may include different information. FIG. 4 illustrates an example staggering pattern 400 of common information transmitted using an unlicensed spectrum according to various examples. In the example of FIG. 4, as with the example of FIG. 3 described above, the unlicensed spectrum includes a number of carrier frequencies, with a set of the carrier frequencies 405-420 that may include transmissions of common information. In some examples, the unlicensed carrier frequencies 405-420 may be an example of carrier frequencies used by one or more of the eNBs 105, 205, and/or UEs 115, 215 described with reference to FIGS. 1 and/or 2. In the example of FIG. 4, carrier frequencies 405 and 415 may include different portions of transmitted common information than carrier frequencies 410 and 420. The common information transmitted across multiple of the carrier frequencies 405-420 may be combined in such examples to obtain the full set of common information. For example, first ($F_1$) and third ($F_3$) carrier frequencies 405, 415 may include synchronization information 425, 435 and broadcast information 445, 455, respectively. Second ($F_2$) and fourth ($F_4$) carrier frequencies 410, 420 may include synchronization information 430, 440 only. Furthermore, in some examples, each synchronization information transmission 425-440 may include a subset of the synchronization information, which may be combined to generate the complete synchronization information transmitted from the eNB.

Similarly as discussed above, according to various examples a staggering pattern for transmitting such common information 425-455 across each of the carrier frequencies 405-420 in the set of carrier frequencies may be provided to UEs, or may be derived by UEs based on knowledge of relationships between the carrier frequencies 405-420 and relative timing of each of the times $t_1$-$t_4$ of transmissions of the common information. The common information 425-455 may include similar information and be used for similar purposes as described above with respect to the example of FIG. 3.

Figure 5:
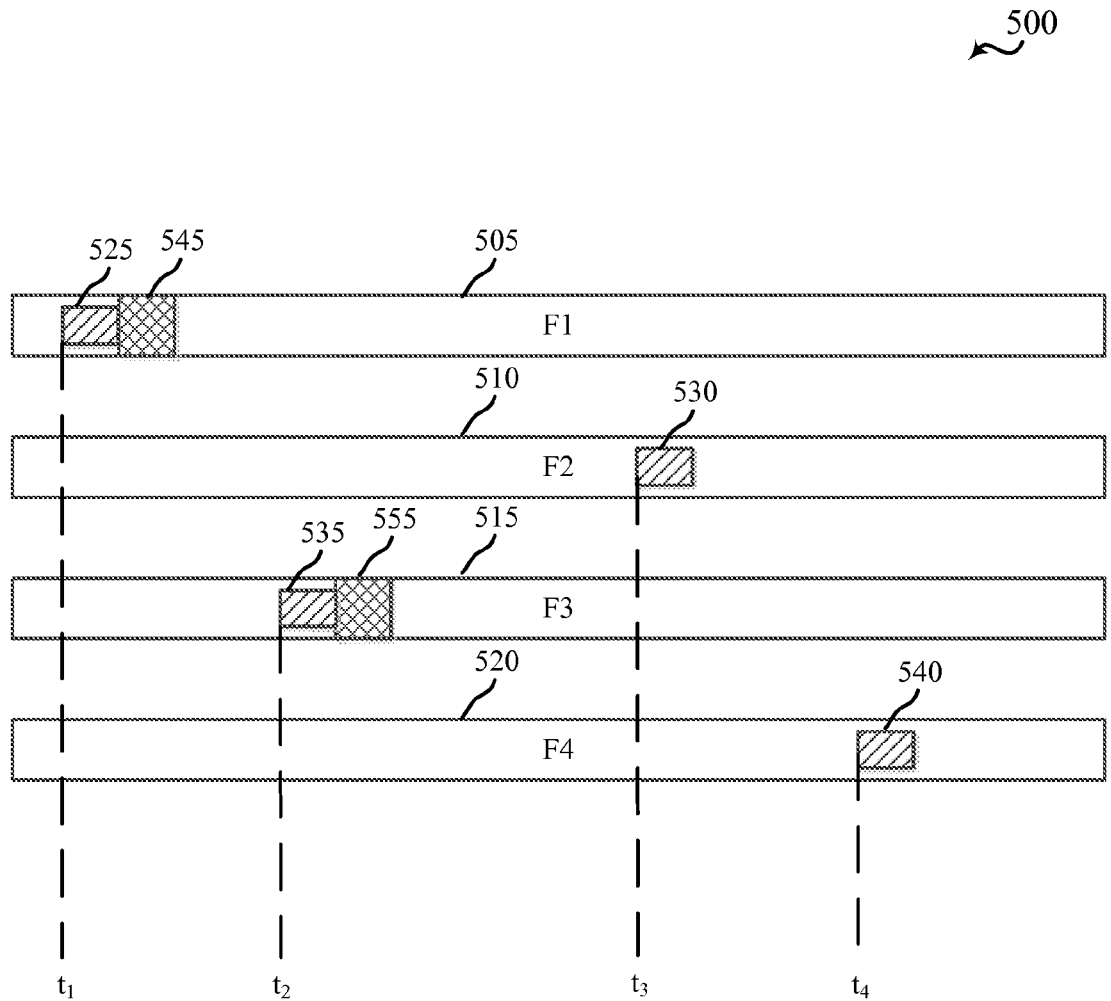
FIG. 5 illustrates another example of carrier frequencies in an unlicensed spectrum and transmission of common information on the carrier frequencies according to a staggering pattern according to various examples.

In further examples, the common information transmitted on different carrier frequencies of a set of carrier frequencies may occupy less than the available bandwidth of the respective carrier. FIG. 5 illustrates an example staggering pattern 500 of common information transmitted using an unlicensed spectrum according to various examples. In the example of FIG. 5, as with the examples of FIGS. 3-4 described above, the unlicensed spectrum includes a number of carrier frequencies, with a set of the carrier frequencies 505-520 that may include transmissions of common information. In some examples, the unlicensed carrier frequencies 505-520 may be an example of carrier frequencies used by one or more of the eNBs 105, 205, and/or UEs 115, 215 described with reference to FIGS. 1 and/or 2. In the example of FIG. 5, similarly as discussed above with respect to FIG. 4, carrier frequencies 505 and 515 may include different portions of transmitted common information than carrier frequencies 510 and 520. The common information transmitted across multiple of the carrier frequencies 505-520 may be combined in such examples to obtain the full set of common information. In the example of FIG. 5, broadcast information 545 and 555 may be transmitted on carrier frequencies 505 and 515 only.

Furthermore, in the example of FIG. 5, synchronization information transmissions 525, 530, 535, and 540 may be carried by each of the carrier frequencies, namely carrier frequencies 505, 510, 515, and 520, respectively. The synchronization transmissions 525-540, in this example, may occupy less than the entire available bandwidth of the respective carrier frequencies 505-520. According to some deployments, a transmitter may be required to transmit signals that occupy a minimum amount of bandwidth of a respective carrier frequency. For example, the transmitter may be required to transmit signals that occupy 80% of the available bandwidth. Thus, in cases where synchronization information 525-540 occupies less than the available bandwidth, the remaining portion of the bandwidth may be used for transmitting additional information. In some examples, such additional information may be a reference signal that may also be used for signal measurement or synchronization purposes.

Similarly as discussed above, according to various examples a staggering pattern for transmitting such common information 525-555 across each of the carrier frequencies 505-520 in the set of carrier frequencies may be provided to UEs, or may be derived by UEs based on knowledge of relationships between the carrier frequencies 505-520 and relative timing of each of the times $t_1$-$t_4$ of transmissions of the common information 525-555. The common information 525-555 may include similar information and be used for similar purposes as described above with respect to the examples of FIGS. 3-4.

Figure 6A:
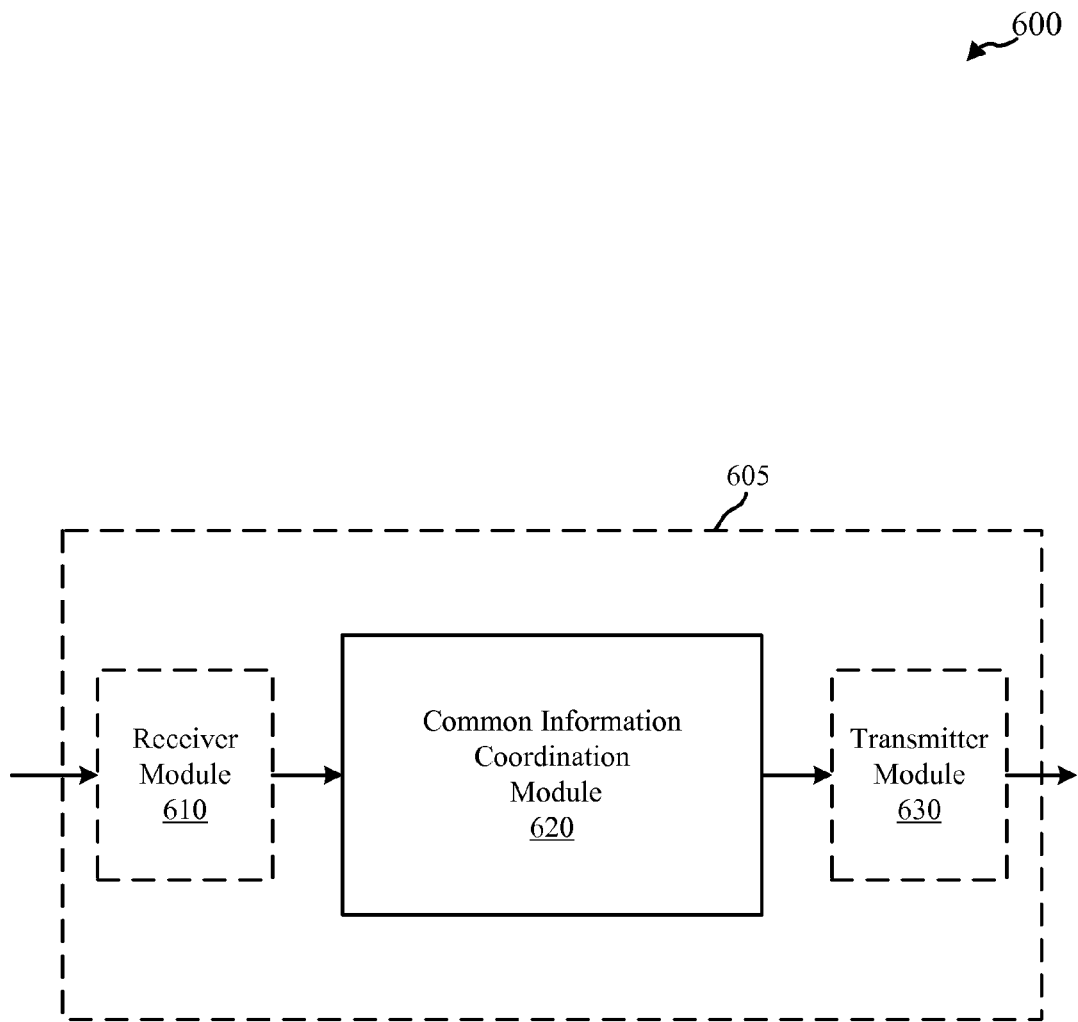
FIGS. 6A and 6B show block diagrams of examples of devices, such as eNBs or UEs, for use in wireless communications according to various examples.

Referring now to FIG. 6A, a block diagram 600 illustrates a device 605 for use in wireless communications in accordance with various examples. In some examples, the device 605 may be an example of one or more aspects of the eNBs 105, 205, and/or UEs 115, 215 described with reference to FIGS. 1 and/or 2. The device 605 may also be a processor. The device 605 may include a receiver module 610, a common information coordination module 620, and/or a transmitter module 630. Each of these components may be in communication with each other.

The components of the device 605 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may be or include a radio frequency (RF) receiver, such as an RF receiver operable to receive transmissions in a licensed spectrum and/or an unlicensed spectrum. The receiver module 610 may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some examples, the transmitter module 630 may be or include an RF transmitter, such as an RF transmitter operable to transmit in the licensed spectrum and/or the unlicensed spectrum. The transmitter module 630 may be used to transmit various types of data and/or control signals (i.e., transmissions) over one or more communication links of a wireless communications system, such as one or more communication links of the wireless communications system 100 and/or 200 described with reference to FIGS. 1 and/or 2.

In some examples, the common information coordination module 620 may perform common information staggering operations. When the common information coordination module 620 determines that the unlicensed spectrum is to be used in communications, a staggering pattern may be determined and common information may be transmitted and/or received according to the determined staggering pattern. The transmission may include, for example, transmitting common information according to the staggering pattern in bursts having a duration less than a duration which would require a CCA. Receiving information according to the staggering pattern may include receiving one or more transmissions of common information, and deriving the staggering pattern based on the received transmission(s). In some cases, the staggering pattern may be provided by an eNB or other entity. In other cases, the staggering pattern may be derived based on a time of transmission and a carrier frequency of one common information transmission. The common information transmitted over different carrier frequencies may include the same common information that is repeated in the transmissions on each carrier frequency, or may include a subset of the common information transmitted on one or more carrier frequencies that may be combined to obtain the complete set of common information. As discussed above, common information may include synchronization information, broadcast information, and/or paging information, for example.

Figure 6B:
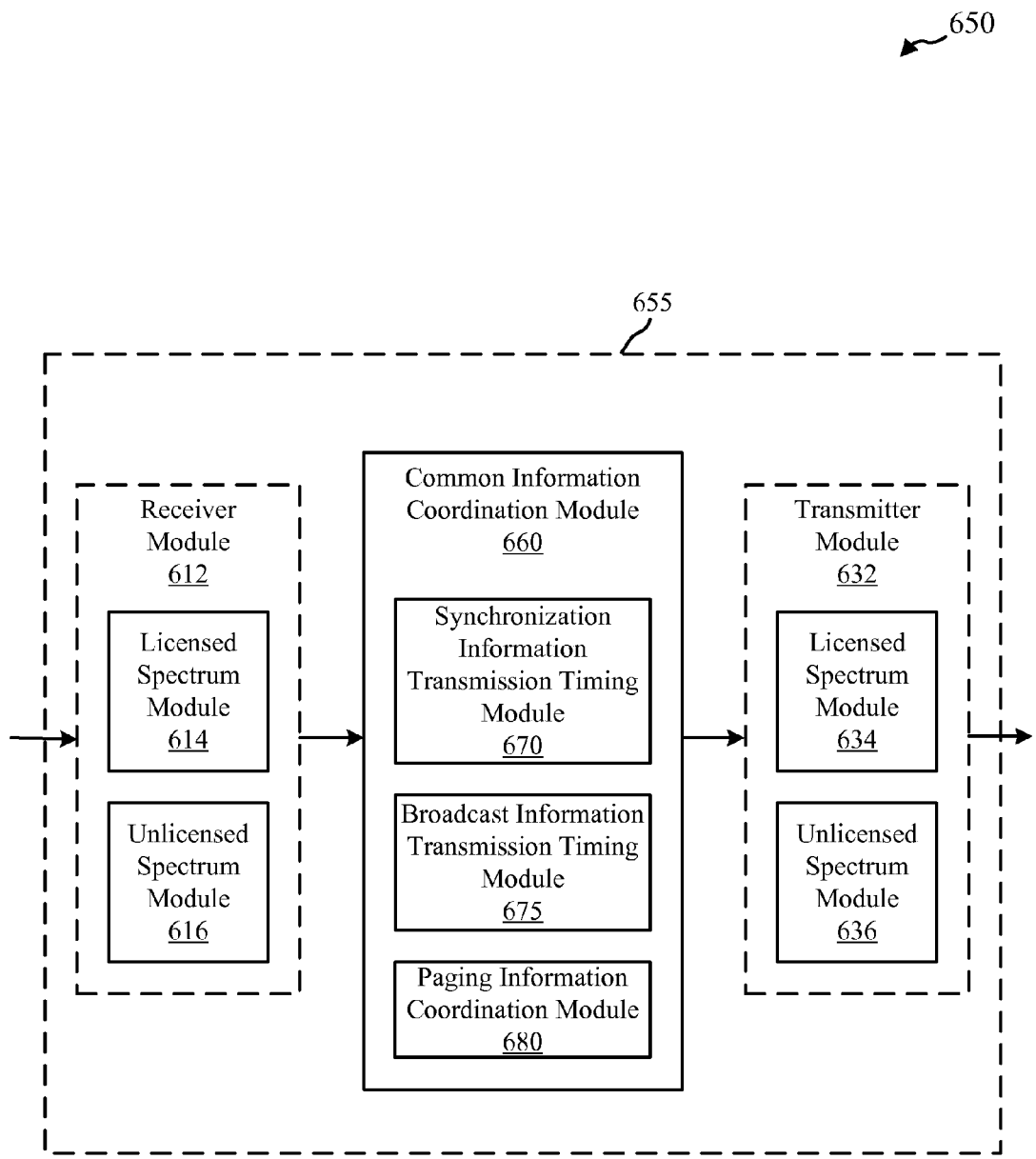

Referring now to FIG. 6B, a block diagram 650 illustrates a device 655 for use in wireless communications in accordance with various examples. In some examples, the device 655 may be an example of one or more aspects of the eNBs 105, 205, and/or UEs 115, 215 described with reference to FIGS. 1 and/or 2. The device 655 may also be a processor. The device 655 may include a receiver module 612, a common information coordination module 660, and/or a transmitter module 632. Each of these components may be in communication with each other.

The components of the device 655 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 612 may be an example of the receiver module 610 of FIG. 6A. The receiver module 612 may be or include a radio frequency (RF) receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 614 and an unlicensed spectrum module 616. The receiver module 612, including the licensed spectrum module 614 and the unlicensed spectrum module 616, may be used to receive various types of data and/or control signals (i.e., transmissions) over one or more communication links of a wireless communications system including the licensed and unlicensed spectrums, such as one or more communication links of the wireless communications system 100 and/or 200 described with reference to FIGS. 1 and/or 2.

In some examples, the transmitter module 632 may be an example of the transmitter module 630 of FIG. 6A. The transmitter module 632 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 634 and an unlicensed spectrum module 636. The transmitter module 632 may be used to transmit various types of data and/or control signals (i.e., transmissions) over one or more communication links of a wireless communications system, such as one or more communication links of the wireless communications system 100 and/or 200 described with reference to FIGS. 1 and/or 2.

The common information coordination module 660 may be an example of the common information coordination module 620 described with reference to FIG. 6A and may include a synchronization information transmission timing module 670, a broadcast information transmission timing module 675, and/or a paging information coordination module 680. Each of these components may be in communication with each other.

In some examples, the synchronization information transmission timing module 670 may determine a staggering pattern associated with transmissions of synchronization information across a set of carrier frequencies. The staggering pattern, and information transmitted according to the staggering pattern, may include, for example, synchronization information that is transmitted as discussed above with respect to FIGS. 3-5.

In some examples, the broadcast information transmission timing module 675 may determine one or more broadcast transmissions that are associated with the identified staggering pattern. The staggering pattern, and information transmitted according to the staggering pattern, may include, for example, broadcast information that is transmitted as discussed above with respect to FIGS. 3-5.

In some examples, paging information coordination module 680 may determine paging information for a particular UE that is transmitted according to paging opportunities associated with the UE. The paging opportunities may be identified for particular UEs and may be determined as a function of UE ID and/or carrier index. Thus, paging information may be included in multiple different carrier frequencies, which may thus provide additional opportunities for paging of a UE and may reduce delay in providing a paging message to a UE. Paging information, as is known in the art, may be used to inform UEs about a system information change and/or provide alerts to a UE such as ETWS and/or CMAS alerts, for example.

Figure 7:
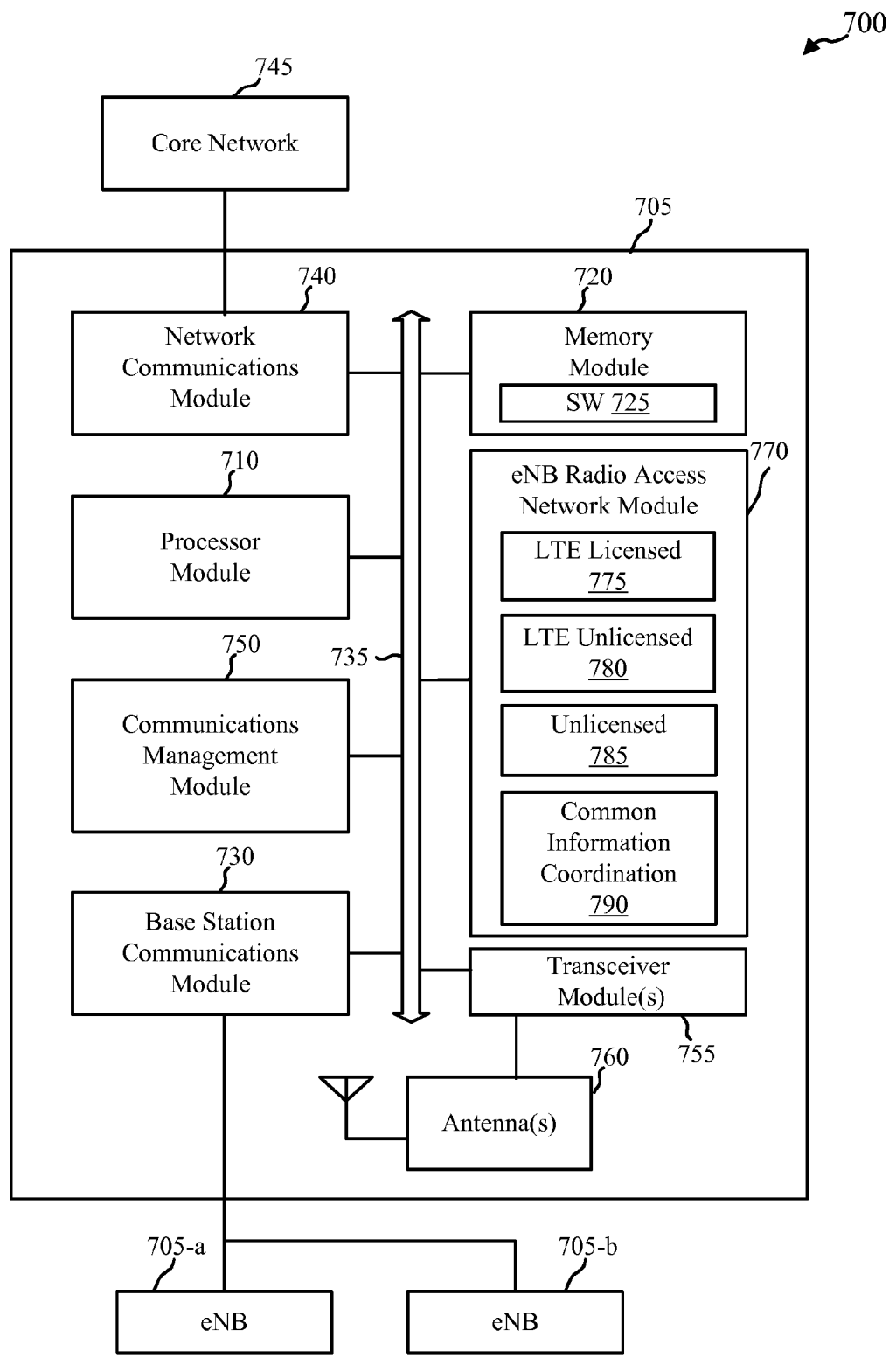
FIG. 7 shows a block diagram that illustrates an example of an eNB architecture according to various examples.

Turning to FIG. 7, a block diagram 700 is shown that illustrates an eNB 705 configured for LTE operations over the unlicensed spectrum. In some examples, the eNB 705 may be an example of one or more aspects of the eNBs or devices 105, 205, 605, and/or 655 described with reference to FIGS. 1, 2, 6A, and/or 6B. The eNB 705 may be configured to implement at least some of the common information coordination and staggering features and functions described with respect to FIGS. 1, 2, 3, 4, 5, 6A, and/or 6B. The eNB 705 may include a processor module 710, a memory module 720, at least one transceiver module (represented by transceiver module(s) 755), at least one antenna (represented by antenna(s) 760), and/or an eNB radio access network module 770. The eNB 705 may also include one or both of a base station communications module 730 and a network communications module 740. Each of these components may be in communication with each other, directly or indirectly, over one or more buses 735.

The memory module 720 may include random access memory (RAM) and/or read-only memory (ROM). The memory module 720 may store computer-readable, computer-executable software (SW) code 725 containing instructions that are configured to, when executed, cause the processor module 710 to perform various functions described herein for using LTE-based communications in a licensed and/or unlicensed spectrum, including the performance of common information transmission across a set of carrier frequencies. Alternatively, the software code 725 may not be directly executable by the processor module 710 but be configured to cause the eNB 705, e.g., when compiled and executed, to perform various of the functions described herein.

The processor module 710 may include an intelligent hardware device, e.g., a central processing unit (CPU), a microcontroller, an ASIC, etc. The processor module 710 may process information received through the transceiver module(s) 755, the base station communications module 730, and/or the network communications module 740. The processor module 710 may also process information to be sent to the transceiver module(s) 755 for transmission through the antenna(s) 760, to the base station communications module 730 for transmission to one or more other base stations or eNBs 705-a and 705-b, and/or to the network communications module 740 for transmission to a core network 745, which may be an example of aspects of the core network 130 described with reference to FIG. 1. The processor module 710 may handle, alone or in connection with the radio access network module 770, various aspects of using LTE-based communications in a licensed and/or unlicensed spectrum, including the performance of common information transmission across a set of carrier frequencies.

The transceiver module(s) 755 may include a modem configured to modulate the packets and provide the modulated packets to the antenna(s) 760 for transmission, and to demodulate packets received from the antenna(s) 760. The transceiver module(s) 755 may be implemented as one or more transmitter modules and one or more separate receiver modules. The transceiver module(s) 755 may support communications in at least one licensed spectrum and in at least one unlicensed spectrum. The transceiver module(s) 755 may be configured to communicate bi-directionally, via the antenna(s) 760, with one or more of the UEs or devices 115 and/or 215 described with reference to FIGS. 1 and/or 2, for example. The eNB 705 may typically include multiple antennas 760 (e.g., an antenna array). The eNB 705 may communicate with the core network 745 through the network communications module 740. The eNB 705 may communicate with other base stations or eNBs, such as the eNBs 705-a and 705-b, using the base station communications module 730.

According to the architecture of FIG. 7, the eNB 705 may further include a communications management module 750. The communications management module 750 may manage communications with other base stations, eNBs, and/or devices. The communications management module 750 may be in communication with some or all of the other components of the eNB 705 via the bus or buses 735. Alternatively, functionality of the communications management module 750 may be implemented as a component of the transceiver module(s) 755, as a computer program product, and/or as one or more controller elements of the processor module 710.

The eNB radio access network module 770 may be configured to perform and/or control some or all of the eNB functions or aspects in the unlicensed spectrum described with reference to FIGS. 1, 2, 3, 4, 5, 6A, and/or 6B related to using LTE-based communications in a licensed and/or unlicensed spectrum. For example, the eNB radio access network module 770 may be configured to support a supplemental downlink mode, a carrier aggregation mode, and/or a standalone mode, and provide transmission of common information across a set of carrier frequencies. The eNB radio access network module 770 may include an LTE licensed module 775 configured to handle LTE communications over the licensed spectrum, an LTE unlicensed module 780 configured to handle LTE communications over the unlicensed spectrum, and/or an unlicensed module 785 configured to handle communications in an unlicensed spectrum other than LTE communications over the unlicensed spectrum. The eNB radio access network module 770 may also include a common information coordination module 790 configured to perform, for example, any of the eNB common information transmission and coordination functions described with reference to FIGS. 1, 2, 3, 4, 5, 6A and/or 6B. The common information coordination module 790 may be an example of similar modules (e.g., module 620 and/or module 660) described with reference to FIGS. 6A and/or 6B. The eNB radio access network module 770, or portions of it, may include a processor and/or some or all of the functionality of the eNB radio access network module 770 may be performed by the processor module 710 and/or in connection with the processor module 710.

Figure 8:
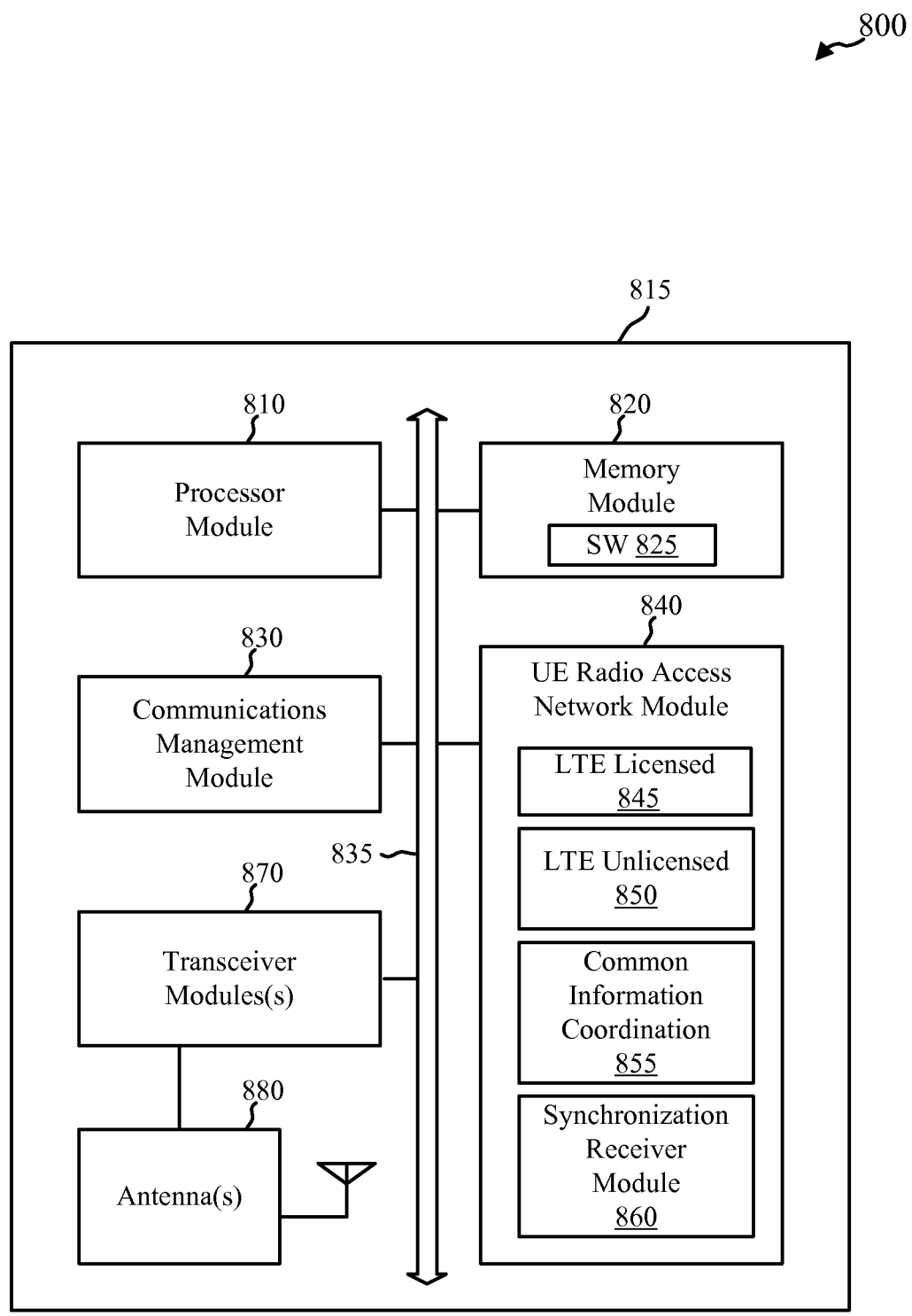
FIG. 8 shows a block diagram that illustrates an example of a UE architecture according to various examples.

Turning to FIG. 8, a block diagram 800 is shown that illustrates a UE 815 configured for LTE communications over the unlicensed spectrum. The UE 815 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 815 may have an internal power supply (not shown), such as a small battery, to facilitate mobile operation. In some examples, the UE 815 may be an example of one or more of the UEs or devices 115 and/or 215 described with reference to FIGS. 1 and/or 2. The UE 815 may be configured to communicate with one or more of the eNBs or devices 105, 205, 605, 655, and/or 705 described with reference to FIGS. 1, 2, 6A, 6B, and/or 7.

The UE 815 may include a processor module 810, a memory module 820, at least one transceiver module (represented by transceiver module(s) 870), at least one antenna (represented by antenna(s) 880), and/or a UE radio access network module 840. Each of these components may be in communication with each other, directly or indirectly, over one or more buses 835.

The memory module 820 may include RAM and/or ROM. The memory module 820 may store computer-readable, computer-executable software (SW) code 825 containing instructions that are configured to, when executed, cause the processor module 810 to perform various functions described herein for using LTE-based communications in a licensed and/or unlicensed spectrum. Alternatively, the software code 825 may not be directly executable by the processor module 810 but be configured to cause the UE 815 (e.g., when compiled and executed) to perform various of the UE functions described herein.

The processor module 810 may include an intelligent hardware device, e.g., a CPU, a microcontroller, an ASIC, etc. The processor module 810 may process information received through the transceiver module(s) 870 and/or information to be sent to the transceiver module(s) 870 for transmission through the antenna(s) 880. The processor module 810 may handle, alone or in connection with the UE radio access network module 840, various aspects of using LTE-based communications in a licensed and/or unlicensed spectrum.

The transceiver module(s) 870 may be configured to communicate bi-directionally with eNBs. The transceiver module(s) 870 may be implemented as one or more transmitter modules and one or more separate receiver modules. The transceiver module(s) 870 may support communications in at least one licensed spectrum and in at least one unlicensed spectrum. The transceiver module(s) 870 may include a modem configured to modulate the packets and provide the modulated packets to the antenna(s) 880 for transmission, and to demodulate packets received from the antenna(s) 880. While the UE 815 may include a single antenna, there may be examples in which the UE 815 may include multiple antennas 880.

According to the architecture of FIG. 8, the UE 815 may further include a communications management module 830.

The communications management module 830 may manage communications with various base stations or eNBs. The communications management module 830 may be a component of the UE 815 in communication with some or all of the other components of the UE 815 over the one or more buses 835. Alternatively, functionality of the communications management module 830 may be implemented as a component of the transceiver module(s) 870, as a computer program product, and/or as one or more controller elements of the processor module 810.

The UE radio access network module 840 may be configured to perform and/or control some or all of the UE functions or aspects in the unlicensed spectrum described in FIGS. 1, 2, 3, 4, 5, 6A, and/or 6B related to using LTE-based communications in a licensed and/or unlicensed spectrum. For example, the UE radio access network module 840 may be configured to support a supplemental downlink mode, a carrier aggregation mode, and/or a standalone mode, and to receive common information that is transmitted across a set of carrier frequencies. The UE radio access network module 840 may include an LTE licensed module 845 configured to handle LTE communications over the licensed spectrum, an LTE unlicensed module 850 configured to handle LTE communications over the unlicensed spectrum, a common information coordination module 855 and/or a synchronization receiver module 860. The common information coordination module 855 may be an example of similar modules (e.g., module 620 and/or module 660) described with reference to FIGS. 6A and/or 6B, and may coordinate the reception of common information transmitted according to a staggering pattern across a set of carrier frequencies. The synchronization receiver module 860 may include receivers to allow the searching of multiple carrier frequencies for common information in parallel. The UE radio access network module 840, or portions of it, may include a processor and/or some or all of the functionality of the UE radio access network module 840 may be performed by the processor module 810 and/or in connection with the processor module 810.

Figure 9:
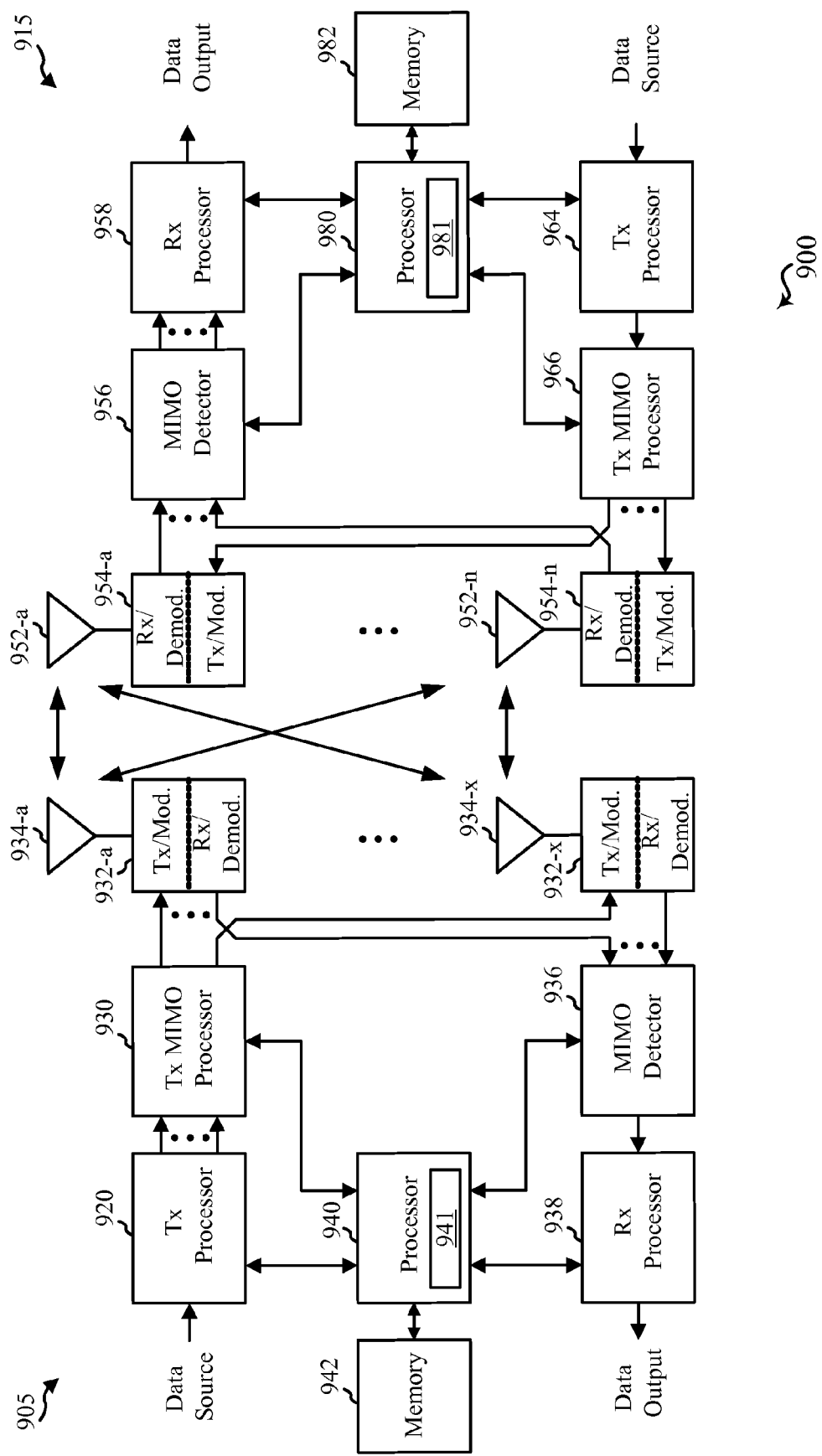
FIG. 9 shows a block diagram that illustrates an example of a multiple-input multiple-output (MIMO) communications system according to various examples.

Turning next to FIG. 9, a block diagram of a multiple-input multiple-output (MIMO) communication system 900 is shown including an eNB 905 and a UE 915. The eNB 905 and the UE 915 may support LTE-based communications using a licensed and/or unlicensed spectrum. The eNB 905 may be an example of one or more aspects of the eNBs or devices 105, 205, 605, 655, and/or 705 described with reference to FIGS. 1, 2, 6A, 6B, and/or 7, while the UE 915 may be an example of one or more aspects of the UEs or devices 115, 215, 605, 655, and/or 815 described with reference to FIGS. 1, 2, 6A, 6B, and/or 8. The system 900 may illustrate aspects of the wireless communications system 100 and/or 200 described with reference to FIGS. 1 and/or 2, and may perform common information staggering functions such as described with reference to FIGS. 3, 4, and/or 5.

The eNB 905 may be equipped with antennas 934-*a* through 934-*x*, and the UE 915 may be equipped with antennas 952-*a* through 952-*n*. In the system 900, the eNB 905 may be able to send data over multiple communication links at the same time. Each communication link may be called a "layer" and the "rank" of the communication link may indicate the number of layers used for communication. For example, in a 2×2 MIMO system where eNB 905 transmits two "layers," the rank of the communication link between the eNB 905 and the UE 915 may be two.

At the eNB 905, a transmit (Tx) processor 920 may receive data from a data source. The transmit processor 920 may process the data. The transmit processor 920 may also generate reference symbols and/or a cell-specific reference signal. A transmit (Tx) MIMO processor 930 may perform spatial processing (e.g., precoding) on data symbols, control symbols, and/or reference symbols, if applicable, and may provide output symbol streams to the transmit (Tx) modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932-*a* through 932-*x* may be transmitted via the antennas 934-*a* through 934-*x*, respectively.

At the UE 915, the antennas 952-*a* through 952-*n* may receive the DL signals from the eNB 905 and may provide the received signals to the receive (Rx) demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols if applicable, and provide detected symbols. A receive (Rx) processor 958 may process (e.g., demodulate, deinterleave, and decode) the detected symbols, providing decoded data for the UE 915 to a data output, and provide decoded control information to a processor 980, or memory 982. The processor 980 may include a module or function 981 that may perform various functions related to using LTE-based communications in a licensed and/or unlicensed spectrum. For example, the module or function 981 may perform some or all of the functions of the common information coordination module 620 or 660 described with reference to FIG. 6A or 6B, and/or of the UE radio access network module 840 described with reference to FIG. 8.

On the uplink (UL), at the UE 915, a transmit (Tx) processor 964 may receive and process data from a data source. The transmit processor 964 may also generate reference symbols for a reference signal. The symbols from the transmit processor 964 may be precoded by a transmit (Tx) MIMO processor 966 if applicable, further processed by the transmit (Tx) modulators 954-*a* through 954-*n* (e.g., for SC-FDMA, etc.), and be transmitted to the eNB 905 in accordance with the transmission parameters received from the eNB 905. At the eNB 905, the UL signals from the UE 915 may be received by the antennas 934, processed by the receiver (Rx) demodulators 932, detected by a MIMO detector 936 if applicable, and further processed by a receive (Rx) processor 938. The receive processor 938 may provide decoded data to a data output and to the processor 940 or memory 942. The processor 940 may include a module or function 941 that may perform various aspects related to using LTE-based communications in a licensed and/or unlicensed spectrum. For example, the module or function 941 may perform some or all of the functions of the common information coordination module 620 or 660 described with reference to FIG. 6A or 6B, or the eNB radio access network module 770 described with reference to FIG. 7. In some examples, the module or function 941 may be used to determine a staggering pattern for the eNB 905's transmission of common information across a set of carrier frequencies.

The components of the eNB 905 may, individually or collectively, be implemented with one or more ASICs adapted to perform some or all of the applicable functions in hardware. Each of the noted modules may be a means for performing one or more functions related to operation of the system 900. Similarly, the components of the UE 915 may, individually or collectively, be implemented with one or more ASICs adapted to perform some or all of the applicable functions in hardware. Each of the noted components may be a means for performing one or more functions related to operation of the system 900.

Figure 10:
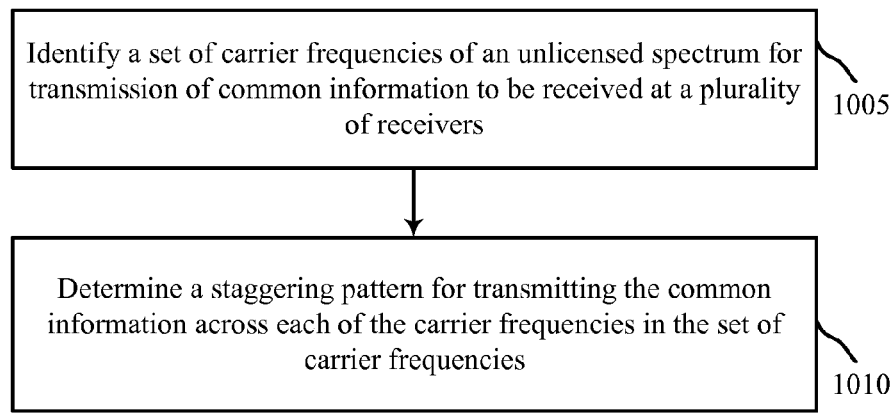
FIGS. 10 and 11 are flowcharts of examples of methods for wireless communications using unlicensed spectrum (e.g., at an eNB) according to various examples.

FIG. 10 is a flow chart illustrating an example of a method 1000 for wireless communications. For clarity, the method 1000 is described below with reference to ones of the eNBs or devices 105, 205, 605, 655, 705 and/or 905 described with reference to FIGS. 1, 2, 6A, 6B, 7, and/or 9. In one example, an eNB may execute one or more sets of codes to control the functional elements of the eNB to perform the functions described below.

At block 1005, a set of carrier frequencies of an unlicensed spectrum may be identified for transmission of common information to be received at a plurality of receivers. The set of carrier frequencies may be identified as carrier frequencies within a frequency band, or in different frequency bands. For example, carrier frequencies may be 20 MHz carrier frequencies within a 5 GHz frequency band. In some examples, the set of carrier frequencies may include an anchor frequency and one or more flexible carrier frequencies within the frequency band. The operation(s) at block 1005 may in some cases be performed using the common information coordination module 620 and/or 655 described with reference to FIGS. 6A and/or 6B, the eNB radio access network module 770 described with reference to FIG. 7, and/or the module or function 941 described with reference to FIG. 9.

At block 1010, a staggering pattern is determined for transmitting the common information across each of the carrier frequencies in the set of carrier frequencies. The operation(s) at block 1010 may in some cases be performed using the common information coordination module 620 and/or 655 described with reference to FIGS. 6A and/or 6B, the eNB radio access network module 770 described with reference to FIG. 7, and/or the module or function 941 described with reference to FIG. 9. The staggering pattern may be determined so as to provide transmission of at least a portion of the common information across different carrier frequencies in the set of carrier frequencies at different times. The duration of common information transmissions in the staggering pattern may be selected so as to not require CCA to determine availability of the unlicensed spectrum.

In some examples, the staggering pattern may be determined and signaling provided to receivers with information related to the staggering pattern. In other examples, the staggering pattern may be determined based on a transmission time and frequency of a first common information transmission and a predetermined relationship between the first common information transmission and remaining common information transmissions. In such a manner, if a receiver receives one of the common information transmissions, the remainder of the staggering pattern may be derived. In yet another example, the staggering pattern may be determined from a transmission time and frequency of the common information transmission provided in each of the common information transmission. In such case, a receiver may derive a transmission time and frequency of a subsequent common information transmission from the common information transmission at a given transmission time and frequency. Thus, the method 1000 may provide for wireless communications. It should be noted that the method 1000 is just one implementation and that the operations of the method 1000 may be rearranged or otherwise modified such that other implementations are possible.

Figure 11:
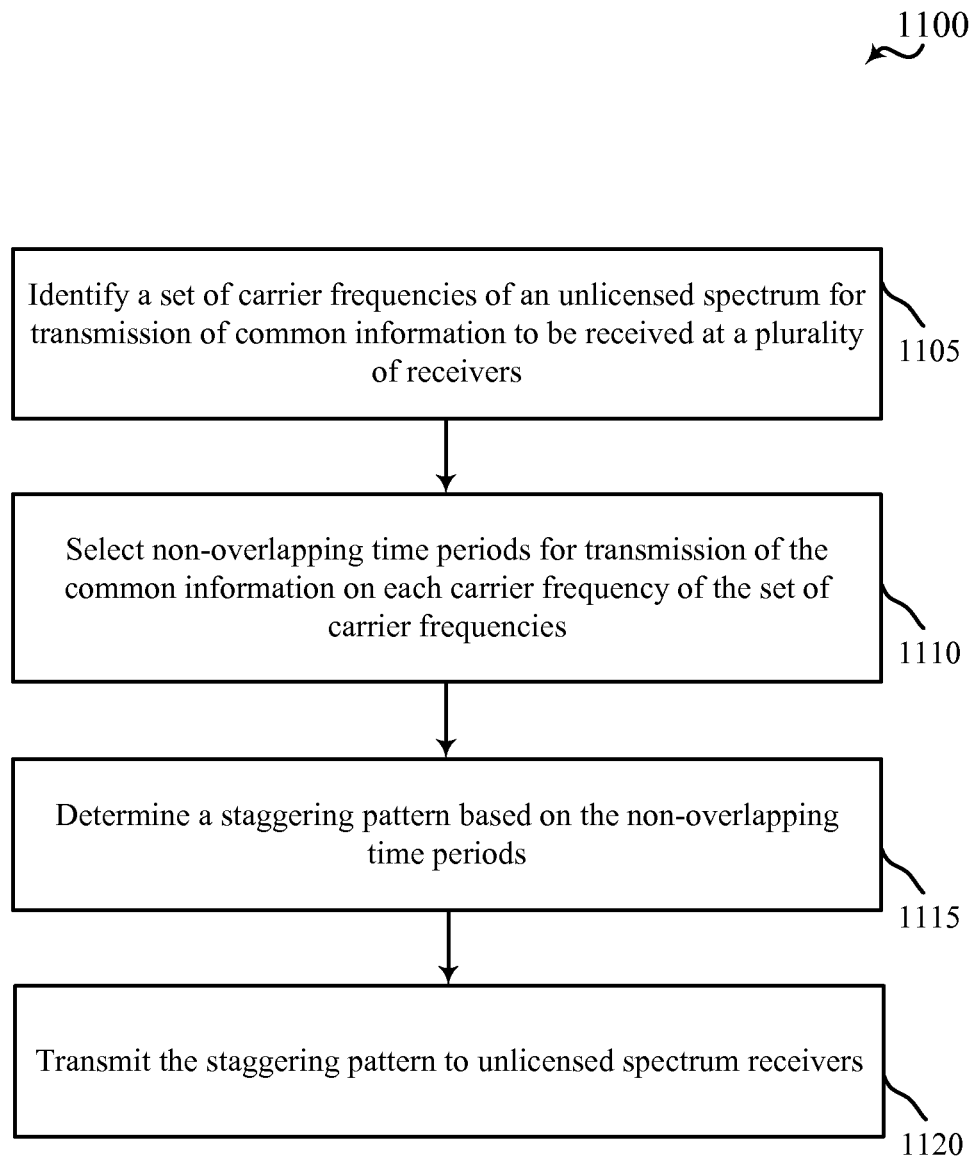

FIG. 11 is a flow chart illustrating an example of a method 1100 for wireless communications. For clarity, the method 1100 is described below with reference to ones of the eNBs or devices 105, 205, 605, 655, 705 and/or 905 described with reference to FIGS. 1, 2, 6A, 6B, 7, and/or 9. In one example, an eNB may execute one or more sets of codes to control the functional elements of the eNB to perform the functions described below.

At block 1105, a set of carrier frequencies of an unlicensed spectrum is identified for transmission of common information to be received at a plurality of receivers. The set of carrier frequencies may be identified as carrier frequencies within a frequency band, or in different frequency bands. For example, carrier frequencies may be 20 MHz carrier frequencies within a 5 GHz frequency band. In some examples, the set of carrier frequencies may include an anchor frequency and one or more flexible carrier frequencies within the frequency band. The operation(s) at block 1105 may in some cases be performed using the common information coordination module 620 and/or 655 described with reference to FIGS. 6A and/or 6B, the eNB radio access network module 770 described with reference to FIG. 7, and/or the module or function 941 described with reference to FIG. 9.

At block 1110, non-overlapping time periods for transmission of the common information on each carrier frequency of the set of carrier frequencies are selected. The duration of common information transmissions in each non-overlapping time period for transmission may be selected so as to not require a CCA to determine availability of the unlicensed spectrum. The operation(s) at block 1110 may in some cases be performed using the common information coordination module 620 and/or 655 described with reference to FIGS. 6A and/or 6B, the eNB radio access network module 770 described with reference to FIG. 7, and/or the module or function 941 described with reference to FIG. 9.

At block 1115, a staggering pattern is determined based on the non-overlapping time periods. The staggering pattern may be determined so as to provide transmission of at least a portion of the common information across different carrier frequencies in the set of carrier frequencies at different times. In some examples, the staggering pattern may be determined and signaling provided to receivers with information related to the staggering pattern. In other examples, the staggering pattern may be determined based on a transmission time and frequency of a first common information transmission and a predetermined relationship between the first common information transmission and remaining common information transmissions. In such a manner, if a receiver receives one of the common information transmissions, the remainder of the staggering pattern may be derived. In yet another example, the staggering pattern may be determined from a transmission time and frequency of the common information transmission provided in each of the common information transmission. In such case, a receiver may derive a transmission time and frequency of a subsequent common information transmission from the common information transmission at a given transmission time and frequency. The operation(s) at block 1115 may in some cases be performed using the common information coordination module 620 and/or 655 described with reference to FIGS. 6A and/or 6B, the eNB radio access network module 770 described with reference to FIG. 7, and/or the module or function 941 described with reference to FIG. 9.

At block 1120, the staggering pattern is transmitted to unlicensed spectrum receivers. The operation(s) at block 1120 may in some cases be performed using the common information coordination module 620 and/or the transmitter module 630 described with reference to FIG. 6A, the synchronization information transmission timing module 670, the broadcast information transmission timing module 675, and or transmitter module 632 described with reference to FIG. 6B, the common information coordination module 790, the transceiver module 755, and/or the antennas 760 described with reference to FIG. 7, and/or the module or function 941, the Tx processor 920, the Tx MIMO processor 930, the Tx modulators 932-*a* through 932-*x*, and/or the antennas 934-*a* through 934-*x* described with reference to FIG. 9.

Thus, the method 1100 may provide for wireless communications. It should be noted that the method 1100 is just one implementation and that the operations of the method 1100 may be rearranged or otherwise modified such that other implementations are possible.

Figure 12:
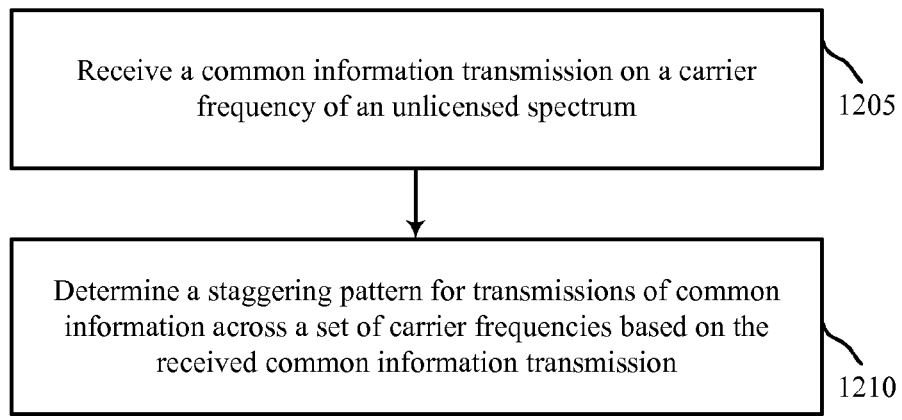
FIGS. 12 and 13 are flowcharts of examples of methods for wireless communications using unlicensed spectrum (e.g., at a UE) according to various examples.

FIG. 12 is a flow chart illustrating an example of a method 1200 for wireless communications. For clarity, the method 1200 is described below with reference to ones of the UEs or devices 115, 215, 605, 655, 815 and/or 915 described with reference to FIGS. 1, 2, 6A, 6B, 8, and/or 9. In one example, a UE may execute one or more sets of codes to control the functional elements of the UE to perform the functions described below.

At block 1205, a common information transmission may be received on a carrier frequency of an unlicensed spectrum. The common information transmission may be received on a first carrier frequency and may be received at a first time. In some examples, the common information may be received on an anchor carrier. In such case, the common information may be received by a UE that is searching on an anchor carrier for the common information. Alternatively, the UE may search for the common information on a plurality of carrier frequencies in parallel and may receive the common information on one or more of the searched carrier frequencies. The operation(s) at block 1205 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

At block 1210, a staggering pattern may be determined for transmissions of common information across a set of carrier frequencies based on the received common information transmission. In some cases, the staggering pattern may be determined based on a defined relationship between the first carrier and first transmission time and remaining transmission times and carrier frequencies, which may be used to derive the carrier frequencies and transmission times for the staggering pattern. In other cases, the staggering pattern may be determined from a transmission time and frequency of the common information transmission provided in each of the common information transmission, with each common information transmission providing transmission time and frequency of a subsequent common information transmission. In yet other cases, the staggering pattern may be included in the common information transmission. In still other cases, the staggering pattern may be received by the UE in a SIB or in an RRC configuration/reconfiguration message. The operation(s) at block 1210 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

Thus, the method 1200 may provide for wireless communications. It should be noted that the method 1200 is just one implementation and that the operations of the method 1200 may be rearranged or otherwise modified such that other implementations are possible.

Figure 13:
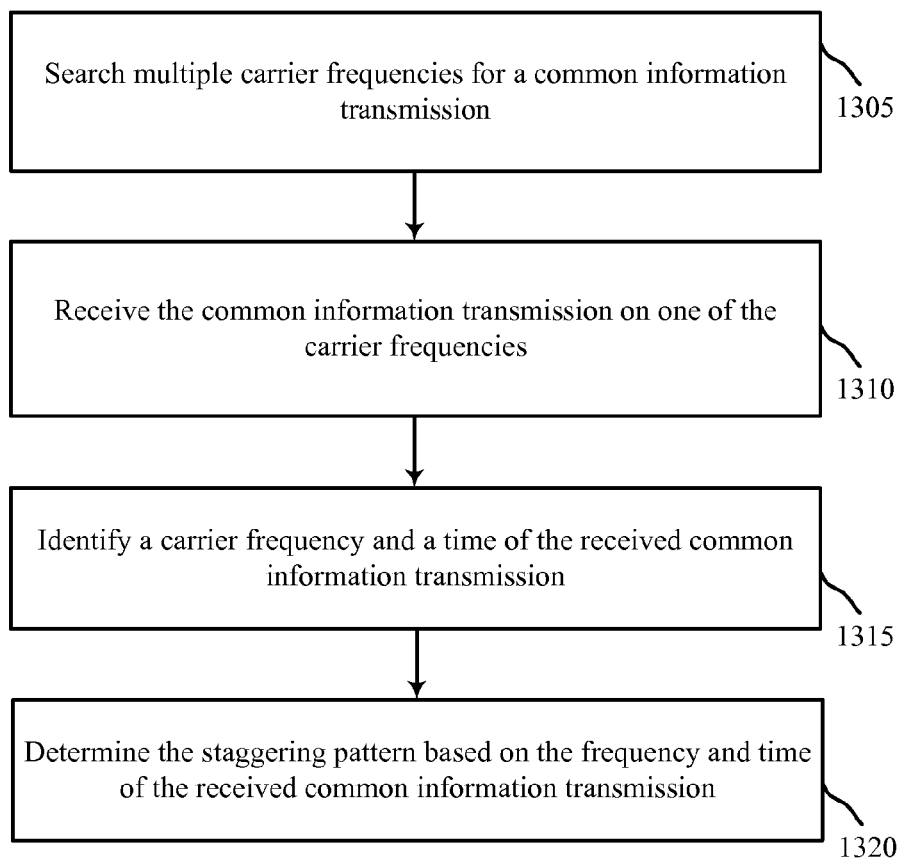

FIG. 13 is a flow chart illustrating an example of a method 1300 for wireless communications. For clarity, the method 1200 is described below with reference to ones of the UEs or devices 115, 215, 605, 655, 815 and/or 915 described with reference to FIGS. 1, 2, 6A, 6B, 8, and/or 9. In one example, a UE may execute one or more sets of codes to control the functional elements of the UE to perform the functions described below.

At block 1305, multiple carrier frequencies may be searched for a common information transmission. The carrier frequencies that are searched may be provided to the UE in a previous communication, such as a previous common information transmission, a SIB, or RRC configuration/reconfiguration message, for example. In some cases, the searched carrier frequencies may include a set of anchor frequencies, from which other flexible frequencies may be derived. The operation(s) at block 1305 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

At block 1310, the common information transmission may be received on one of the carrier frequencies. The common information transmission may include, for example, synchronization information and/or broadcast information that may be used by a UE to perform channel acquisition more quickly and with fewer computational resources than may be required in the absence of the synchronization and/or broadcast information. The common information transmission may also include paging information identified for a specific UE transmitted during a paging opportunity for the UE, and paging opportunities for a UE may be a function of UE ID and/or carrier index, thus providing paging opportunities on multiple carrier frequencies. The operation(s) at block 1310 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

At block 1315, carrier frequency and a time of the received common information transmission are identified. The operation(s) at block 1315 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

At block 1320, the staggering pattern is determined based on the frequency and time of the received common information transmission at block 1310. In some cases, the staggering pattern may be determined based on a defined relationship between the carrier frequency and transmission time identified at block 1315 and other relative transmission times and carrier frequencies in the set of carrier frequencies, which may be used to derive the carrier frequencies and transmission times for the staggering pattern. In other cases, the staggering pattern may be determined from a transmission time and frequency of the common information transmission provided in each of the common information transmission, with each common information transmission providing transmission time and frequency of a subsequent common information transmission. In yet other cases, the staggering pattern may be included in the common information transmission. In still other cases, the staggering pattern may be received by the UE in a SIB or in an RRC configuration/reconfiguration message. The operation(s) at block 1320 may in some cases be performed using the common information coordination module 620 and/or 655 described with reference to FIGS. 6A and/or 6B, the UE radio access network module 840 described with reference to FIG. 8, and/or the module or function 981 described with reference to FIG. 9.

Thus, the method 1300 may provide for wireless communications. It should be noted that the method 1300 is just one implementation and that the operations of the method 1300 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
identifying a set of carrier frequencies for transmission of common information to be received at a plurality of receivers, wherein the common information comprises at least broadcast channel information and one or more of: synchronization information or paging information; and
determining a staggering pattern for transmitting the common information across each of the carrier frequencies in the set of carrier frequencies, wherein determining the staggering pattern comprises selecting non-overlapping time periods for transmission of the common information on different frequencies of the set of carrier frequencies, and wherein each transmission on the different frequencies of the set of carrier frequencies provides the common information;
wherein the set of carrier frequencies includes at least one anchor frequency and a plurality of flexible carrier frequencies selected from a group of available carrier frequencies;
wherein a transmission bandwidth of the synchronization information is less than an available transmission bandwidth for a respective carrier frequency, and wherein additional information is transmitted using remaining available transmission bandwidth.

2. The method of claim 1, further comprising:
transmitting the common information over the set of carrier frequencies according to the staggering pattern.

3. The method of claim 1, wherein the staggering pattern comprises transmission of the synchronization information on each of the carrier frequencies, and transmission of the broadcast or the paging information on a subset of the carrier frequencies.

4. The method of claim 1, wherein the paging information comprises information identified for a specific user equipment (UE) transmitted during a paging opportunity for the UE, and wherein the paging opportunity is a function of one or more UE identifications, one or more carrier frequencies, or both.

5. The method of claim 1, wherein the paging information is staggered across two or more of the set of carrier frequencies.

6. The method of claim 1, wherein a time period for transmission of the common information on each carrier frequency is less than a predetermined time period.

7. The method of claim 1, wherein the staggering pattern is a predetermined staggering pattern that is determinable upon detection of the common information transmission on one of the set of carrier frequencies.

8. The method of claim 1, wherein the staggering pattern comprises blanking out a subset of carrier frequencies while at least a portion of the common information is transmitted on at least one of the set of carrier frequencies.

9. A method for wireless communications, comprising:
receiving a common information transmission on a carrier frequency, wherein the common information comprises at least broadcast channel information; and
determining a staggering pattern for transmissions of common information across a set of carrier frequencies based on the received common information transmission, wherein determining the staggering pattern comprises:
searching multiple carrier frequencies in parallel or searching a portion of a bandwidth of each carrier frequency in parallel;
combining signals from different carrier frequencies over time to detect a synchronization signal;
identifying a carrier frequency and a time of the received common information transmission; and
determining non-overlapping time periods for transmission of the common information on different frequencies of the set of carrier frequencies, and wherein each transmission on the different frequencies of the set of carrier frequencies provides the common information;
wherein the staggering information is determined based on the frequency and the time of the received common information transmission.

10. The method of claim 9, wherein the receiving a common information transmission comprises searching multiple carrier frequencies for the common information transmission.

11. The method of claim 9, further comprising reporting the staggering pattern to a base station for inter-frequency measurement purposes.

12. The method of claim 9, wherein the common information transmission comprises signaling indicating the staggering pattern.

13. The method of claim 12, further comprising performing an inter-frequency measurement using information from the staggering pattern.

14. The method of claim 9, wherein the common information further comprises one or more of synchronization information or paging information.

15. The method of claim 14, wherein the staggering pattern comprises synchronization information transmission on each of the carrier frequencies, and transmission of broadcast or the paging information on a subset of the carrier frequencies.

16. The method of claim 14, wherein the paging information comprises information identified for a specific user equipment (UE) transmitted during a paging opportunity for the UE, and wherein the paging opportunity is a function of one or more UE identifications, one or more carrier frequencies, or both.

17. The method of claim 9, wherein the set of carrier frequencies includes at least one anchor frequency and a plurality of flexible carrier frequencies selected from a group of available carrier frequencies.

18. An apparatus for wireless communications, comprising:
a processor; and
a memory coupled to the processor; wherein the processor is configured to:
identify a set of carrier frequencies for transmission of common information to be received at a plurality of receivers, wherein the common information comprises at least broadcast channel information and one or more of: synchronization information or paging information; and
determine a staggering pattern for transmitting the common information across each of the carrier frequencies in the set of carrier frequencies, wherein determining the staggering pattern comprises selecting non-overlapping time periods for transmission of the common information on different frequencies of the set of carrier frequencies, and wherein each transmission on the different frequencies of the set of carrier frequencies provides the common information;
wherein the set of carrier frequencies includes at least one anchor frequency and a plurality of flexible carrier frequencies selected from a group of available carrier frequencies;
wherein a transmission bandwidth of the synchronization information is less than an available transmission bandwidth for a respective carrier frequency, and wherein additional information is transmitted using remaining available transmission bandwidth.

19. The apparatus of claim 18, wherein the processor is further configured to cause the apparatus to transmit the common information over the set of carrier frequencies according to the staggering pattern.

20. The apparatus of claim 18 wherein the staggering pattern is a predetermined staggering pattern that is determinable upon detection of the common information transmission on one of the set of carrier frequencies.

21. An apparatus for wireless communications, comprising:
a processor;
memory coupled to the processor, wherein the processor is configured to:
receive a common information transmission on a carrier frequency, wherein the common information comprises at least broadcast channel information; and
determine a staggering pattern for transmissions of common information across a set of carrier frequencies based on the received common information transmission, wherein determining the staggering pattern comprises:
searching multiple carrier frequencies in parallel or searching a portion of a bandwidth of each carrier frequency in parallel;
combining signals from different carrier frequencies over time to detect a synchronization signal;
identifying a carrier frequency and a time of the received common information transmission; and
determining non-overlapping time periods for transmission of the common information on different frequencies of the set of carrier frequencies, and wherein each transmission on the different frequencies of the set of carrier frequencies provides the common information;
wherein the staggering information is determined based on the frequency and the time of the received common information transmission.

22. The apparatus of claim 21 wherein the staggering pattern is a predetermined staggering pattern that is determinable upon detection of the common information transmission on one of the set of carrier frequencies.

* * * * *